United States Patent
McKiel, Jr.

(10) Patent No.: US 8,760,496 B2
(45) Date of Patent: Jun. 24, 2014

(54) METHODS AND SYSTEMS FOR PRESENTING ADJUNCT CONTENT DURING A PRESENTATION OF A MEDIA CONTENT INSTANCE

(75) Inventor: Frank A. McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 669 days.

(21) Appl. No.: 12/912,038

(22) Filed: Oct. 26, 2010

(65) Prior Publication Data

US 2012/0098945 A1    Apr. 26, 2012

(51) Int. Cl.
  *H04N 13/04* (2006.01)
  *H04N 15/00* (2006.01)
  *H04N 5/278* (2006.01)

(52) U.S. Cl.
  USPC .......... 348/43; 348/51; 348/59; 348/584; 348/589; 348/598; 348/599; 348/600

(58) Field of Classification Search
  USPC .......... 348/42–60; 375/240.16; 382/162, 163; 345/589, 590, 592
  See application file for complete search history.

(56) References Cited

U.S. PATENT DOCUMENTS

| | | | | |
|---|---|---|---|---|
| 4,217,648 A * | 8/1980 | Thurm et al. | ............... | 382/162 |
| 4,829,455 A * | 5/1989 | Long et al. | ................... | 345/632 |
| 5,768,403 A * | 6/1998 | Suzuki et al. | ................. | 358/2.1 |
| 5,963,371 A * | 10/1999 | Needham et al. | ............. | 359/464 |
| 5,978,046 A * | 11/1999 | Shintani | ....................... | 348/589 |
| 5,991,511 A * | 11/1999 | Granger | ........................ | 358/1.9 |
| 6,008,907 A * | 12/1999 | Vigneau et al. | ................ | 358/1.9 |
| 6,068,147 A * | 5/2000 | Sheu | ........................... | 215/11.5 |
| 6,078,309 A * | 6/2000 | Chen et al. | ................... | 345/589 |
| 6,177,945 B1 * | 1/2001 | Pleyer | ........................... | 345/473 |
| 6,549,678 B1 * | 4/2003 | Gindele et al. | ............... | 382/254 |
| 6,870,544 B2 * | 3/2005 | Blanchard et al. | ............ | 345/589 |
| 6,915,021 B2 * | 7/2005 | Cannata et al. | .............. | 382/254 |
| 6,930,691 B2 * | 8/2005 | Lebowsky et al. | ........... | 345/597 |
| 7,030,902 B2 * | 4/2006 | Jacobs | ........................... | 348/42 |
| 7,057,768 B2 * | 6/2006 | Zaklika et al. | ................ | 358/1.9 |
| 7,119,760 B2 * | 10/2006 | Edge et al. | ..................... | 345/2.1 |
| 7,164,779 B2 * | 1/2007 | Yerazunis et al. | ............ | 382/100 |
| 7,200,263 B2 * | 4/2007 | Curry et al. | ................... | 382/154 |
| 7,382,490 B2 * | 6/2008 | Lammens et al. | ............ | 358/1.9 |
| 7,411,698 B2 * | 8/2008 | Gallina | .......................... | 358/1.9 |
| 7,612,915 B2 * | 11/2009 | Zeng et al. | .................... | 358/3.02 |
| 7,835,569 B2 * | 11/2010 | Marcu | ........................... | 382/162 |
| 7,936,481 B2 * | 5/2011 | Nakatani et al. | .............. | 358/3.1 |
| 7,965,429 B1 * | 6/2011 | Briggs et al. | .................. | 358/518 |
| 8,194,288 B2 * | 6/2012 | Wen et al. | ..................... | 358/3.23 |

(Continued)

*Primary Examiner* — Dave Czekaj
*Assistant Examiner* — David N Werner

(57) ABSTRACT

An exemplary method includes an adjunct content presentation system including adjunct content within a first image of a media content instance and a second image of the media content instance by setting a pixel value of a first group of pixels included in the first image and a pixel value of a second group of pixels included in the second image and corresponding to the first group of pixels to each be greater than a predetermined neutral pixel value, including the adjunct content within a compensating image by setting a pixel value of a third group of pixels included in the compensating image and corresponding to the first and second groups of pixels to be less than the predetermined neutral pixel value, and presenting the first image, the second image, and the compensating image. Corresponding methods and systems are also disclosed.

19 Claims, 15 Drawing Sheets

(56) References Cited

U.S. PATENT DOCUMENTS

| | | | |
|---|---|---|---|
| 8,237,733 B2* | 8/2012 | Rhodes | 345/589 |
| 8,335,015 B2* | 12/2012 | Klassen et al. | 358/1.9 |
| 8,587,603 B2* | 11/2013 | Chen et al. | 345/589 |
| 2001/0028805 A1* | 10/2001 | Haneda | 399/51 |
| 2003/0091229 A1* | 5/2003 | Edge et al. | 382/162 |
| 2004/0071362 A1* | 4/2004 | Curry et al. | 382/274 |
| 2007/0053513 A1 | 3/2007 | Hoffberg | |
| 2007/0139519 A1 | 6/2007 | Decusatis et al. | |
| 2007/0171275 A1 | 7/2007 | Kenoyer | |
| 2007/0263003 A1* | 11/2007 | Ko et al. | 345/502 |
| 2008/0240557 A1* | 10/2008 | Christie | 382/167 |
| 2009/0322857 A1 | 12/2009 | Jacobs et al. | |
| 2010/0026794 A1* | 2/2010 | Chang | 348/56 |
| 2010/0141742 A1* | 6/2010 | Luber | 348/51 |
| 2011/0102563 A1* | 5/2011 | Johnson et al. | 348/60 |

* cited by examiner

US 8,760,496 B2

METHODS AND SYSTEMS FOR PRESENTING ADJUNCT CONTENT DURING A PRESENTATION OF A MEDIA CONTENT INSTANCE

BACKGROUND INFORMATION

Viewers of movies, television programs, and other types of media content often differ in the amount and/or type of additional information they would like to see while watching the media content. For example, some people prefer to see subtitles when watching a movie or television program while others do not. As another example, some people like to see ticker tape information (e.g., sports scores, news, stock updates, etc.) scrolling across the bottom of a television screen while others consider such information to be distracting or annoying. When more than one person watches media content displayed by a single display device at the same time (e.g., when a family watches a movie or television program together), these differences in viewing preferences can cause dissatisfaction, disagreement, and even contention among those watching the media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
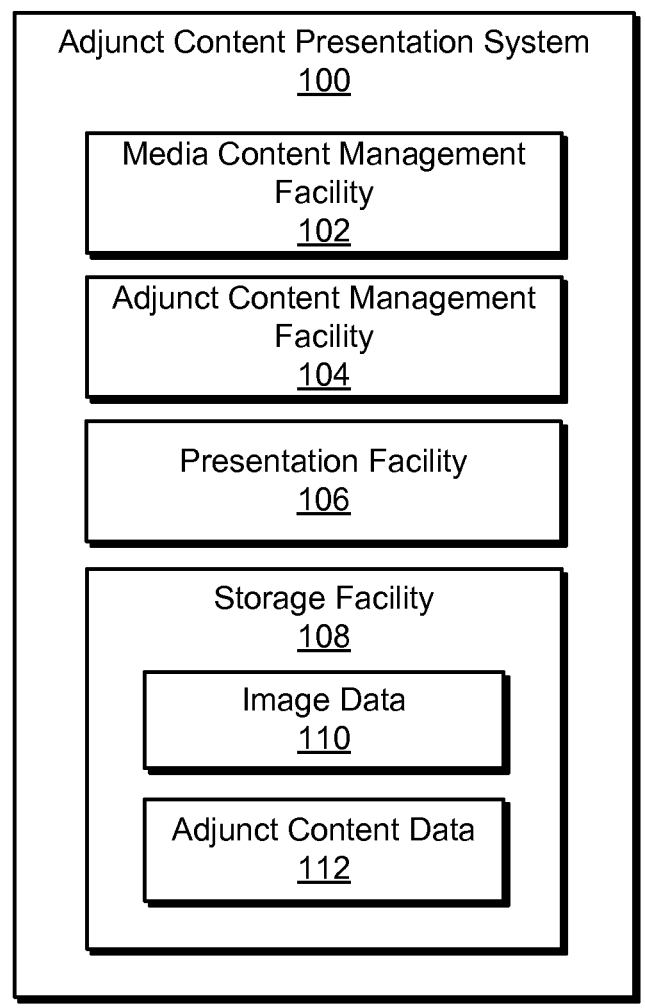
FIG. 1 illustrates an exemplary adjunct content presentation system according to principles described herein.

Methods and systems for presenting adjunct content during a presentation of a media content instance are described herein. In some examples, an adjunct content presentation system may include adjunct content within a first image of a media content instance and a second image of the media content instance by setting a pixel value of a first group of pixels included in the first image and a pixel value of a second group of pixels included in the second image and corresponding to the first group of pixels to each be greater than a predetermined neutral pixel value. The adjunct content presentation system may further include the adjunct content within a compensating image by setting a pixel value of a third group of pixels included in the compensating image and corresponding to the first and second groups of pixels to be less than the predetermined neutral pixel value. The adjunct content presentation system may then present the first image, the second image, and the compensating image.

As will be described in more detail below, the pixel values of the first, second, and third groups of pixels may be set to result in the adjunct content being perceptible to a viewer wearing three-dimensional ("3D") viewing glasses during the presentation of the first image, the second image, and the compensating image and substantially imperceptible to another viewer not wearing 3D viewing glasses during the presentation of the first image, the second image, and the compensating image. Alternatively, the pixel values of the first, second, and third groups of pixels may be set to result in the adjunct content being substantially imperceptible to a viewer wearing 3D viewing glasses during the presentation of the first image, the second image, and the compensating image and perceptible to another viewer not wearing 3D viewing glasses during the presentation of the first image, the second image, and the compensating image.

Hence, the methods and systems described herein may allow some viewers to watch a media content instance without seeing adjunct content displayed therewith. At the same time, the methods and systems described herein may allow other viewers to see adjunct content while watching the media content instance. In this manner, divergent viewing preferences of multiple viewers concurrently watching a media content instance being displayed on a particular display screen (e.g., in a theatre or in the home) may be satisfied.

As used herein, the term "adjunct content" refers to any content that may be displayed concurrently with a media content instance on a display screen. In some examples, the adjunct content may be related to the media content instance. To illustrate, the adjunct content may include subtitle content associated with the media content instance (e.g., closed captioning content), enhanced content associated with the media content instance (e.g., commentary, statistics, elapsed time information, remaining time information, content associated with a video game, metadata, and/or any other type of information associated with the media content instance), and/or any other type of content related to the media content instance. Additionally or alternatively, the adjunct content may be unrelated to the media content instance. Examples of such unrelated adjunct content include, but are not limited to, ticker tape information (e.g., sports scores, news, and/or stock updates), messaging content (e.g., text messages intended for one or more viewers of the media content instance), notification content (e.g., notifications alerting a viewer of an incoming telephone call), and/or any other content unrelated to the media content instance as may serve a particular implementation. Adjunct content may include text, one or more images, or a combination thereof. For illustrative purposes only, it will be assumed in the examples given herein that adjunct content includes only text.

As used herein, "media content" may refer generally to any video content that may be presented to one or more viewers. The term "media content instance" will be used herein to refer to any video, movie, television program, on-demand media program, pay-per-view media program, broadcast media program (e.g., broadcast television program), IPTV media content, video game, advertisement, image, or any segment, component, or combination of these or other forms of media content that may be viewed by one or more viewers. A media content instance may include two-dimensional ("2D") video content and/or 3D video content.

As used herein, the term "pixel value" may be representative of or refer to any visual attribute of a pixel or group of pixels that may be included in an image that is presented to one or more viewers. For example, a pixel value may be representative of a brightness level, a color value, a hue value, a saturation value, and/or any other visual attribute of a pixel as may serve a particular implementation. For illustrative purposes only, the examples given herein will be explained in terms of brightness level.

FIG. 1 illustrates an exemplary adjunct content presentation system 100 (or simply "system 100"). As will be described in more detail below, system 100 may be configured to facilitate selective perception of adjunct content by one or more viewers of a media content instance.

System 100 may include, but is not limited to, a media content management facility 102, an adjunct content management facility 104, a presentation facility 106, and a storage facility 108, which may be in communication with one another using any suitable communication technologies. It will be recognized that although facilities 102-108 are shown to be separate facilities in FIG. 1, any of those facilities may be combined into a single facility as may serve a particular application.

Media content management facility 102 may be configured to manage (e.g., generate, maintain, provide, etc.) media content that may be displayed on a display screen. A particular media content instance may include main content (as opposed to adjunct content) and may be presented in the form of a plurality of sequentially presented main content images representative of the media content instance.

In some examples, a particular main content image may be presented by concurrently or sequentially presenting a first image and a second image provided by media content management facility 102 and that each comprises content representative of a particular portion of the main content image. When viewed by a viewer wearing appropriately configured 3D viewing glasses, the first and second images may be perceived as a single 3D composite image. When viewed by a viewer not wearing 3D viewing glasses, the first and second images may be perceived as a single 2D composite image, which, in some instances, might appear to be slightly blurry if the main content is intended to be viewed in 3D.

Adjunct content management facility 104 may be configured to manage (e.g., generate, maintain, provide, etc.) adjunct content that may be displayed concurrently with a media content instance on a display screen. For example, adjunct content management facility 104 may include adjunct content within the first and second images provided by media content management facility 102 by setting a pixel value (e.g., a brightness level) of a first group of pixels included in the first image and a second group of pixels included in the second image to each be greater than a predetermined neutral pixel value (e.g., a predetermined neutral brightness level). Adjunct content management facility 104 may also provide a compensating image associated with the first and second images and include the adjunct content within the compensating image by setting a pixel value of a third group of pixels included in the compensating image and corresponding to the first and second groups of pixels to be less than the predetermined neutral pixel value.

As will be described in more detail below, the pixel values of the first, second, and third groups of pixels may be set to result in the adjunct content being perceptible to viewers wearing 3D viewing glasses and substantially imperceptible to other viewers not wearing 3D viewing glasses. Alternatively, the pixel values of the first, second, and third groups of pixels may be set to result in the adjunct content being substantially imperceptible to viewers wearing 3D viewing glasses and perceptible to other viewers not wearing 3D viewing glasses.

In some examples, as will be described in more detail below, adjunct content management facility 104 may alternatively include adjunct content within the first and second images by setting the pixel values of the first and second groups of pixels to each be less than the predetermined neutral pixel value and include the adjunct content in the compensating image by setting the pixel value of the third group of pixels to be greater than the predetermined neutral pixel value.

Adjunct content management facility 104 may be further configured to selectively permit a viewer to perceive adjunct content while viewing a media content instance. Various manners in which adjunct content management facility 104 may selectively permit a viewer to perceive adjunct content will be described below.

Presentation facility 106 may be configured to present media content provided by media content management facility 102 and adjunct content provided by adjunct content management facility 104 to one or more viewers. For example, presentation facility 106 may present the first and second images provided by media content management facility 102 and modified by adjunct content management facility 104 to include adjunct content. Presentation facility 106 may also present the compensating image provided by adjunct content management facility 104. In some examples, presentation facility 106 may provide the first image, the second image, and the compensating image for display on a display screen. The display screen may be located within a theatre or other venue, included as part of a television or other personal media content presentation device, and/or otherwise implemented.

In some examples, presentation facility 106 may be configured to concurrently present the first image, the second image, and the compensating image in accordance with a passive polarized processing technique. As used herein, a "passive polarized processing technique" refers to a method of presenting media content in 3D wherein one or more images intended for the left eye (i.e., "left images") and one or more images intended for the right eye (i.e., "right images") are concurrently presented to a viewer. The left and right images may be polarized in mutually orthogonal directions or in any other suitable manner (e.g., using circular polarization). The viewer views the images through polarized 3D viewing glasses so that only the left images are presented to the left eye and only right images are presented to the right eye. The viewer's brain combines the left and right images into one or more 3D images. An exemplary passive polarized processing technique will be described in more detail below.

Additionally or alternatively, presentation facility 106 may be configured to sequentially present the first image, second image, and compensating image in accordance with an active shutter processing technique. As used herein, an "active shutter processing technique" refers to a method of presenting media content in 3D wherein images are alternatingly presented to the left and right eyes of a viewer wearing 3D viewing glasses. The 3D viewing glasses, as will be described in more detail below, may be configured to allow only left images to be presented to the left eye and only right images to be presented to the right eye. The images may be presented in rapid enough succession that the viewer does not notice that different images are being presented to each eye at slightly different times. The net effect is that the left eye sees only the images presented to the left eye and the right eye sees only the images presented to the right eye, thereby creating a perception of 3D in the viewer's brain. An exemplary active shutter processing technique will be described in more detail below.

Passive polarized and active shutter processing techniques are merely illustrative of the many 3D content processing techniques that may be used in accordance with the systems and methods described herein. It will be recognized that presentation facility 106 may be configured to operate in accordance with any 3D or 2D media content processing technique as may serve a particular implementation.

Storage facility 108 may be configured to maintain image data 110 representative of one or more images included in a media content instance managed by media content management facility 102 and adjunct content data 112 representative of adjunct content managed by adjunct content management facility 104. Storage facility 108 may maintain additional or alternative data as may serve a particular implementation.

In some examples, system 100 may be implemented using components typically used to present media content in 3D. Hence, an exemplary 3D content presentation system and various 3D media content processing techniques that may be used in accordance with the systems and methods described herein will now be described.

Figure 2:
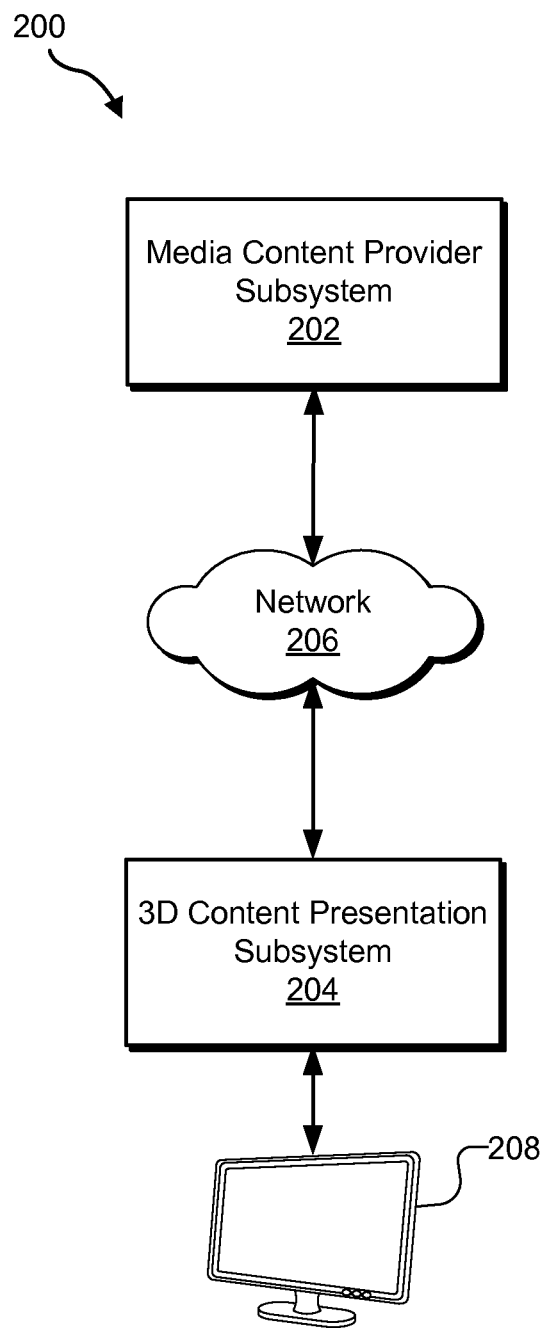
FIG. 2 illustrates an exemplary three-dimensional ("3D") content presentation system according to principles described herein.

FIG. 2 illustrates an exemplary 3D content presentation system 200 that may implement system 100. 3D content presentation system 200 may include a media content provider subsystem 202 (or simply "provider subsystem 202") and a 3D content presentation subsystem 204 in communication with one another via a network 206. Media content management facility 102, adjunct content management facility 104, presentation facility 106, and storage facility 108 may each be implemented on one or both of provider subsystem 202 and 3D content presentation subsystem 204.

Provider subsystem 202 and 3D content presentation subsystem 204 may communicate using any suitable communication technologies, devices, networks, media, and protocols supportive of remote data communications. For example, provider subsystem 202 and 3D content presentation subsystem 204 may communicate over network 206 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 206 may include one or more networks or types of networks (and communication links thereto) capable of carrying communications, media content, and/or data signals between provider subsystem 202 and 3D content presentation subsystem 204. For example, network 206 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between provider subsystem 202 and 3D content presentation subsystem 204. Communications between provider subsystem 202 and 3D content presentation subsystem 204 may be transported using any one of above-listed networks, or any combination or sub-combination of the above-listed networks.

While FIG. 2 shows provider subsystem 202 and 3D content presentation subsystem 204 communicatively coupled via network 206, it will be recognized that provider subsystem 202 and 3D content presentation subsystem 204 may be configured to communicate one with another in any other suitable manner (e.g., via a direct connection).

In some examples, provider subsystem 202 may be configured to generate or otherwise provide media content (e.g., in the form of one or more media content streams) to 3D content presentation subsystem 204. Provider subsystem 202 may additionally be configured to provide adjunct content to 3D content presentation subsystem 204.

3D content presentation subsystem 204 may be configured to present media content received from provider subsystem 202. 3D content presentation subsystem 204 may additionally or alternatively be configured to present adjunct content received from provider subsystem 202, generated by 3D content presentation subsystem 204, and/or received from any other source.

As shown in FIG. 2, 3D content presentation subsystem 204 may be communicatively coupled to a display device 208. Exemplary display devices 208 include, but are not limited to, televisions, computer monitors, handheld computing devices with display screens, mobile devices (e.g., mobile phones), and/or any other device comprising a display screen on which media content may be displayed. 3D content presentation subsystem 204 may present media content and/or adjunct content by way of display device 208.

In certain embodiments, system 100 may be implemented entirely by or within provider subsystem 202 or 3D content presentation subsystem 204. In other embodiments, components of system 100 may be distributed across provider subsystem 202 and 3D content presentation subsystem 204. For example, 3D content presentation subsystem 204 may include a client (e.g., a client application) implementing one or more of the facilities of system 100.

Provider subsystem 202 may be implemented by one or more computing devices. For example, provider subsystem 202 may be implemented by one or more server devices. Additionally or alternatively, 3D content presentation subsystem 204 may be implemented as may suit a particular implementation. For example, 3D content presentation subsystem 204 may be implemented by one or more media content presentation devices, which may include, but are not limited to, a media content projector device, a set-top box device, a DVR device, a media content processing device (e.g., a DVD player), a communications device, a mobile access device (e.g., a mobile phone device, a handheld device, a laptop computer, a tablet computer, a personal-digital assistant device, etc.), a personal computer, a gaming device, a television device, and/or any other device configured to perform one or more of the processes and/or operations described herein.

Figure 3:
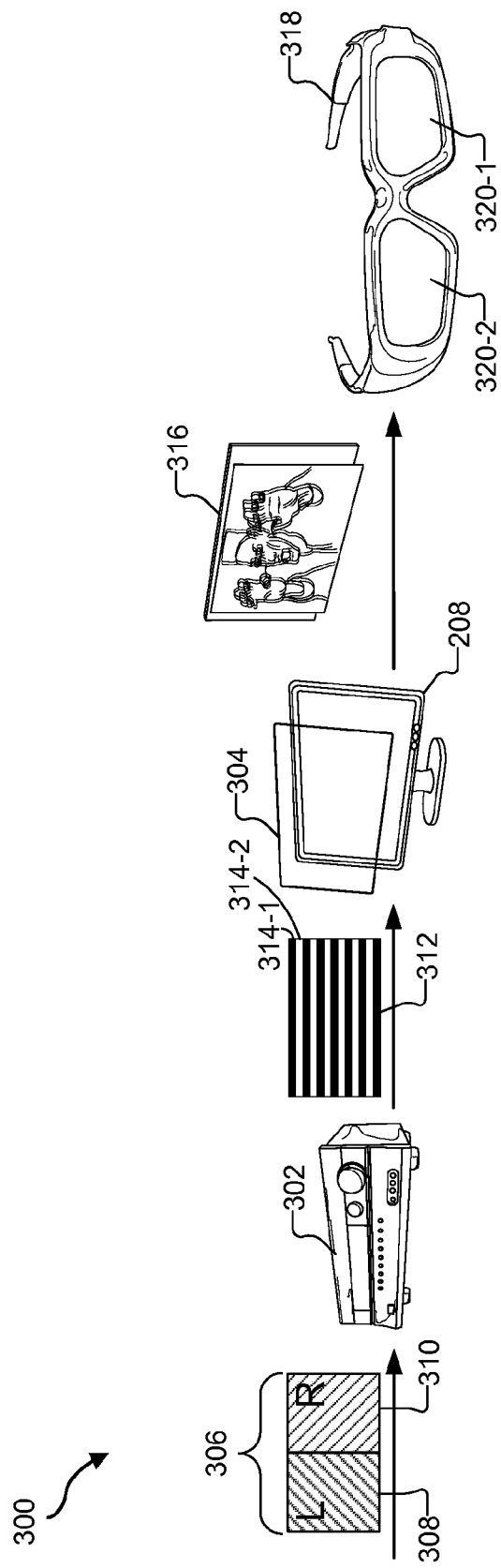
FIG. 3 illustrates an exemplary implementation of the system of FIG. 2 wherein a passive polarization processing technique is used to present 3D video content to a viewer according to principles described herein.

FIG. 3 illustrates an exemplary implementation 300 of system 200 wherein a passive polarized processing technique is used to present 3D video content to a viewer. As shown in FIG. 3, implementation 300 may include a 3D media content processing device 302, display device 208, and a polarizing screen 304 mounted on or otherwise included within display device 208.

3D processing device 302 may include any suitable computing device (e.g., one or more media content projector devices, set-top box devices, personal computers, etc.) configured to be able to selectively present media content in 3D (i.e., 3D processing device 302 has the ability to present different images to the left and right eyes). 3D processing device 302 may be configured to receive a 3D video content stream, which, as shown in FIG. 3, may include a video frame 306 comprising data 308 representative of a left image intended for a left eye of a viewer and data 310 representative of a right image intended for a right eye of the viewer. Data 308 and 310 may be included and/or arranged in video frame 306 in any suitable manner.

As mentioned, in a passive polarized processing technique, left and right images are concurrently presented to the left and right eyes of a viewer. To this end, 3D processing device 302 may be configured to process video frame 306 and generate another video frame 312 that includes interleaved rows 314 (e.g., rows 314-1 and 314-2) of left image pixels and right image pixels. The left image pixels represent the left image defined by the left image data 308 included in video frame 306 and the right image pixels represent the right image defined by the right image data 310 included in video frame 306. 3D processing device 302 may then transmit interleaved video frame 312 to display device 208, which may use interleaved video frame 312 to concurrently display the interleaved rows 314 of left and right image pixels. The displayed left and right pixel rows 314 are represented by composite image 316 in FIG. 3.

Polarizing screen 304 may be configured to polarize the left and right pixel rows 314 in any suitable manner. For example, polarizing screen 304 may use linear polarization to polarize the left and right pixel rows 314 in orthogonal directions. Alternatively, polarizing screen 304 may use circular or any other type of passive polarization technique to polarize the left and right pixel rows 314. In this manner, a viewer wearing polarized 3D viewing glasses 318 with appropriately polarized lenses 320-1 and 320-2 may perceive the left and right images represented by the left and right pixel rows 314 as a 3D image. For example, lens 320-1 may include a first type of polarizing filter configured to allow the left eye of the viewer to view only left images and lens 320-2 may include a second type of polarizing filter configured to allow the right eye of the viewer to view only right images.

It will be recognized that the passive polarized processing technique described in connection with FIG. 3 is merely illustrative of the many different types of passive polarized processing techniques that may be used in connection with the methods and systems described herein. For example, in some passive polarized processing techniques, the left and right image pixels are not interleaved into a single video frame and are instead transmitted as separate video frames.

Figure 4:
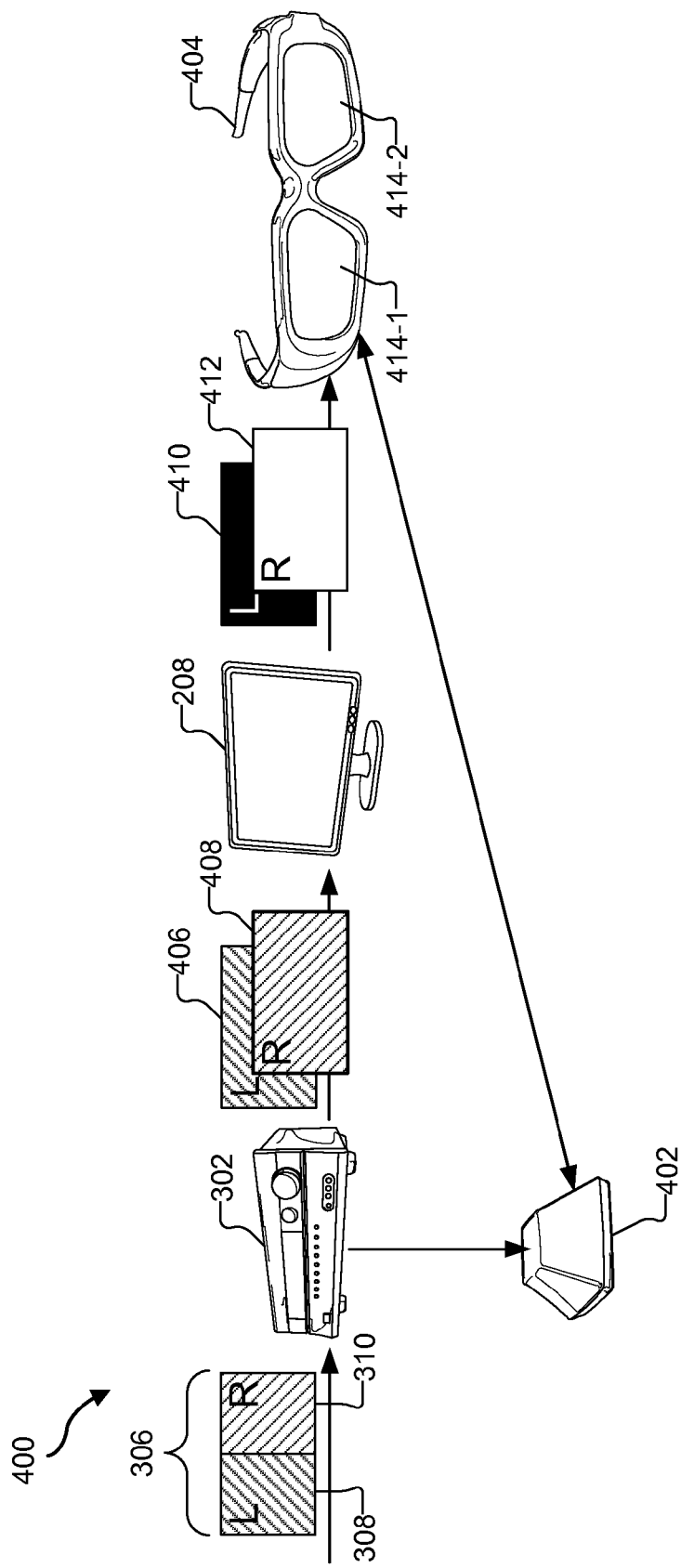
FIG. 4 illustrates another exemplary implementation of the system of FIG. 2 wherein an active shutter processing technique is used to present 3D video content to a viewer according to principles described herein.

FIG. 4 illustrates another exemplary implementation 400 of system 200 wherein an active shutter processing technique is used to present 3D video content to a viewer. As shown in FIG. 4, implementation 400 may include 3D processing device 302 in communication with display device 208. 3D processing device 302 may be further communicatively coupled to an infrared ("IR") transmitter 402, which may be configured to control an operation of active shutter 3D viewing glasses 404.

As mentioned, in an active shutter processing technique, distinct left and right images are presented to the left and right eyes, respectively, in an alternating manner. To this end, 3D processing device 302 may be configured to process video frame 306 and generate a left image frame 406 comprising the data representative of the left image and a right image frame 408 comprising the data representative of the right image. 3D processing device 302 may then transmit left and right image frames 406 and 408 to display device 208. Display device 208 may use left and right image frames 406 and 408 to sequentially display a left image 410 and a right image 412.

In some examples, left and right image frames 406 and 408 are provided to display device 208 by 3D processing device 302 for presentation at a presentation rate at least twice the transmission rate at which video frame 306 is received by 3D processing device 302. For example, 3D processing device 302 may receive video frame 306 at a transmission rate of 60 frames/second. In this example, 3D processing device 302 may provide left and right image frames 406 and 408 to display device 208 for presentation at a presentation rate of at least 120 frames/second. In this manner, the sequentiality of the display of left and right images 410 and 412 may go substantially unnoticed to the viewer, thereby resulting in a seamless 3D video content viewing experience for the viewer.

A viewer of left and right images 410 and 412 may wear active shutter 3D viewing glasses 404 in order to perceive images 410 and 412 as a single 3D image. Active shutter 3D viewing glasses 404 may include a right lens 414-1 and a left lens 414-2 (collectively referred to herein as "lenses 414"). Each lens 414 may be configured to act as a shutter (using, for example, liquid crystal technology) or may have a shutter associated therewith. For illustrative purposes only, it will be assumed in the examples given herein that each lens 414 has a shutter associated therewith. Each shutter may be electrically controlled to selectively close in order to momentarily obscure the view through its respective lens 414. For example, a right shutter associated with right lens 414-1 may be configured to be closed (e.g., effectively opaque) during the display of left image 410 and open (e.g., effectively transparent) during the display of right image 412. Likewise, a left shutter associated with left lens 414-2 may be configured to be closed during the display of right image 412 and open during the display of left image 410. In this manner, only the left image 410 is presented to the left eye and only the right image 412 is presented to the right eye.

IR transmitter 402 may be configured to control the opening and closing of the left and right shutters. To this end, IR transmitter 402 may receive information from 3D processing device 302 that indicates when either left or right images 410 or 412 is to be displayed by display device 208 and direct the left and right shutters to open and close accordingly. IR transmitter 402 may include any suitable combination of hardware and/or software and may be separate from 3D processing device 302, as shown in FIG. 4. Alternatively, IR transmitter 402 may be integrated into 3D processing device 302 in any suitable manner. Moreover, it will be recognized that any other type of transmission link (e.g., Bluetooth, a low power radio transmitter, etc.) may be used in place of IR transmitter 402.

The 3D media content processing techniques described in connection with FIGS. 3-4 are merely illustrative of the many 3D media content processing techniques that may be used in connection with the systems and methods described herein. As will be described in more detail below, the 3D media content processing techniques described in connection with FIGS. 3-4 may be used by system 100 to present adjunct content during a presentation of a media content instance.

Figure 5:
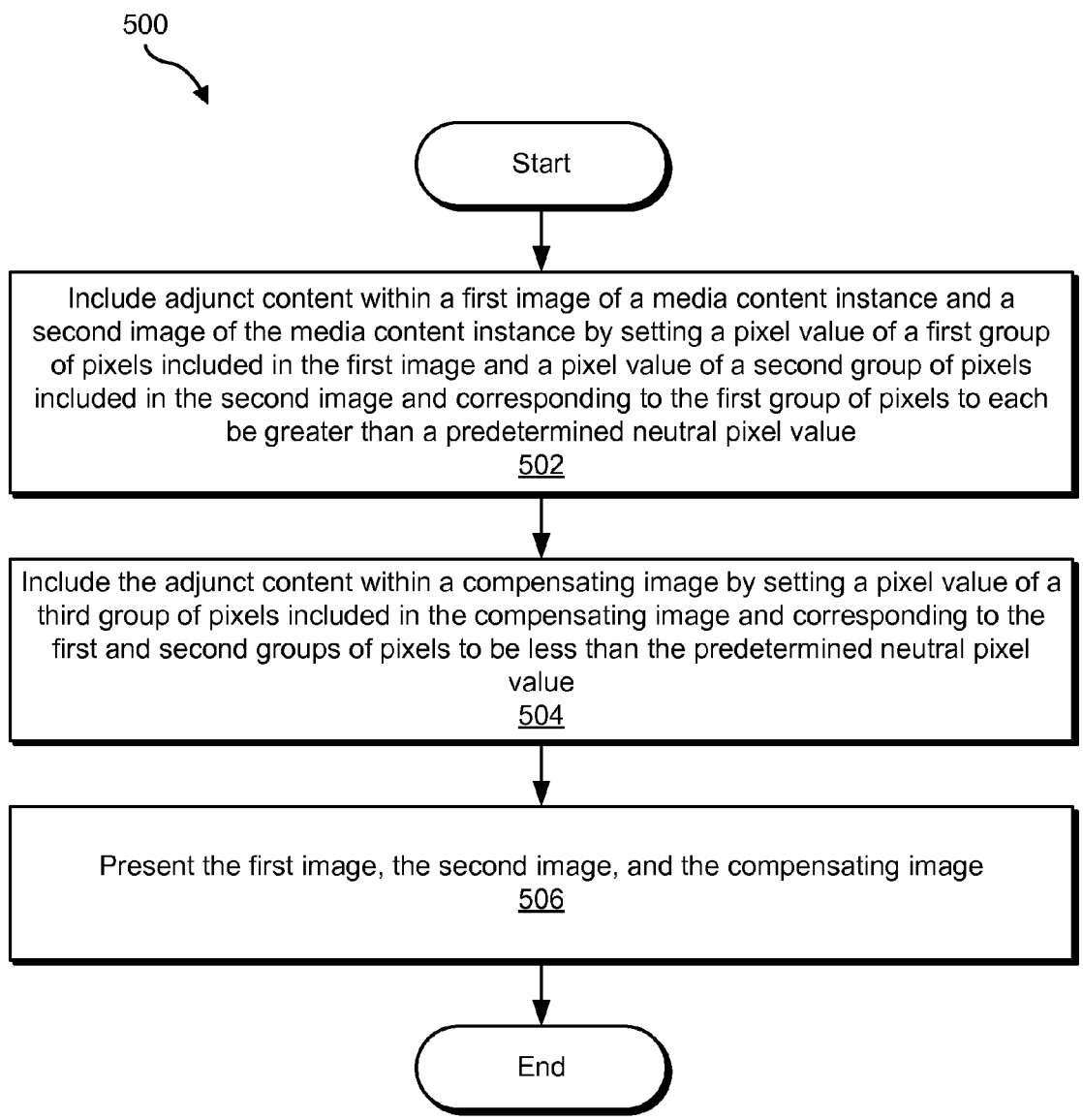
FIG. 5 illustrates an exemplary method of presenting adjunct content during a presentation of a media content instance according to principles described herein.

FIG. 5 illustrates an exemplary method 500 of presenting adjunct content during a presentation of a media content instance. While FIG. 5 illustrates exemplary steps according to one embodiment, other embodiments may omit, add to, reorder, and/or modify any of the steps shown in FIG. 5. The steps shown in FIG. 5 may be performed by any component or combination of components of system 100, media content provider subsystem 202, 3D content presentation subsystem 204, and/or 3D content processing device 302.

In step 502, adjunct content is included within a first image of a media content instance and a second image of the media content instance by setting a pixel value of a first group of pixels included in the first image and a pixel value of a second group of pixels included in the second image and corresponding to the first group of pixels to each be greater than a predetermined neutral pixel value. In some examples, the first image includes a left image similar to the left images described herein and the second image includes a right image similar to the right images described herein. Alternatively, the first image includes a right image similar to the right images described herein and the second image includes a left image similar to the left images described herein. Step 502 may be performed in any of the ways described herein.

In step 504, the adjunct content is included within a compensating image by setting a pixel value of a third group of pixels included in the compensating image and corresponding to the first and second groups of pixels to be less than the predetermined neutral pixel value. Step 504 may be performed in any of the ways described herein.

In step 506, the first image, the second image, and the compensating image are presented. The first image, the second image, and the compensating image may be presented in any of the ways described herein. For example, the first image, the second image, and the compensating image may be concurrently presented in accordance with a passive polarized processing technique. Alternatively, the first image, the second image, and the compensating image may be sequentially presented in any order and in accordance with an active shutter processing technique.

In some examples, the pixel values of the first, second, and third groups of pixels are set (e.g., by adjunct content management facility 104) to result in the adjunct content being perceptible to a viewer wearing 3D viewing glasses during the presentation of the images and substantially imperceptible to another viewer not wearing 3D viewing glasses during the presentation of the images.

Figure 6:
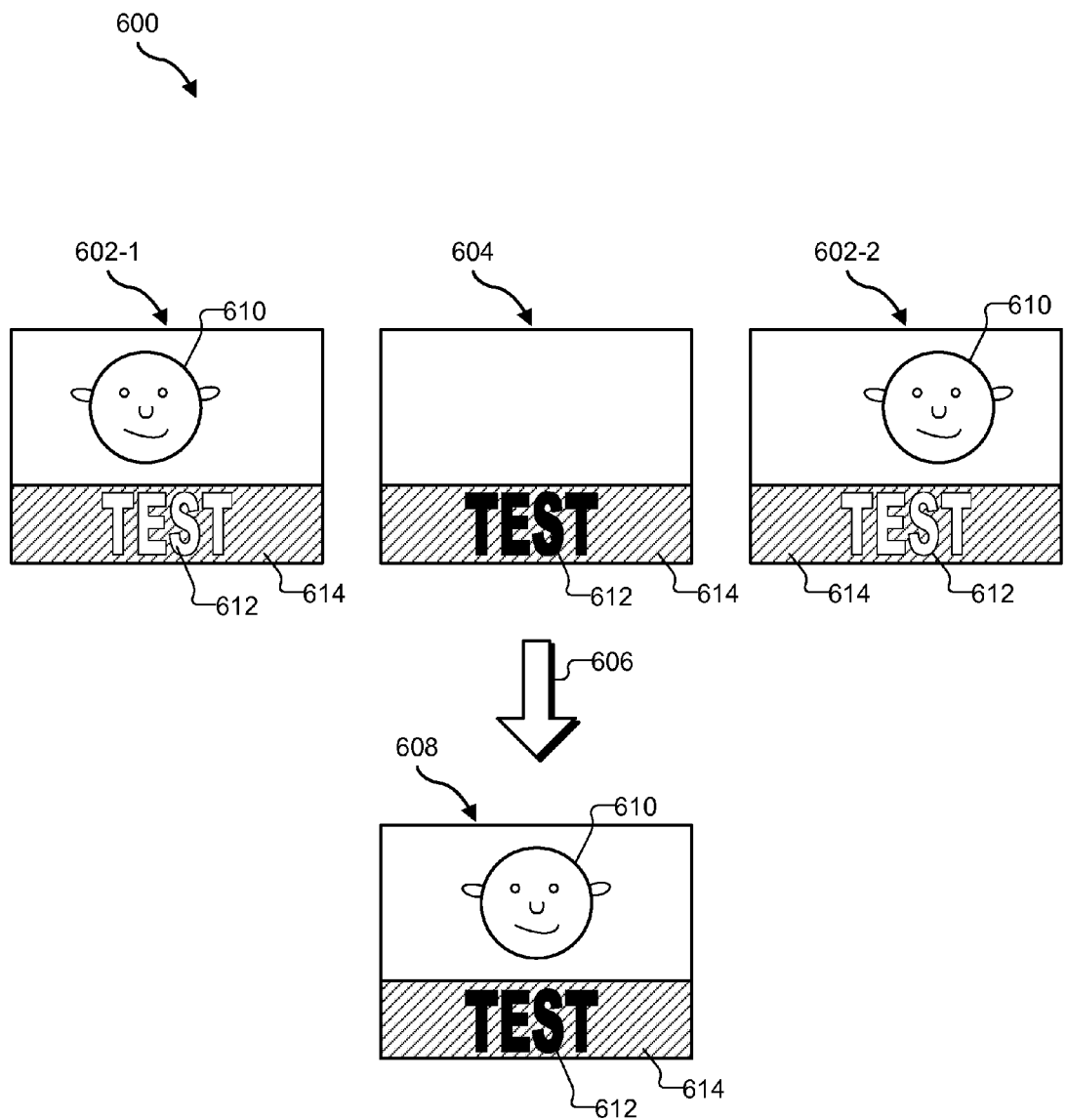
FIG. 6 shows an exemplary viewing scenario according to principles described herein.

To illustrate, FIG. 6 shows an exemplary scenario 600 in which the pixel values of the first, second, and third groups of pixels are set to result in adjunct content being perceptible to a viewer wearing 3D viewing glasses during the presentation of the first image, the second image, and the compensating image, and substantially imperceptible to another viewer not wearing 3D viewing glasses during the presentation of the images.

As shown in FIG. 6, a first image 602-1, a compensating image 604, and a second image 602-2 may be presented to one or more viewers. In some examples, first image 602-1, compensating image 604, and second image 602-2 may be concurrently presented in accordance with a passive polarizing processing technique. Alternatively, first image 602-1, compensating image 604, and second image 602-2 may be sequentially presented in that order (or in any other order) in accordance with an active shutter processing technique as may serve a particular implementation. Presentation (represented by arrow 606) of first image 602-1, compensating image 604, and second image 602-2 may result in a viewer perceiving a single composite image 608.

First and second images 602-1 and 602-2 (collectively referred to as "images 602") may each include or portray a different perspective of a particular media content image 610 included in a media content instance. In this manner, a viewer may perceive media content image 610 in 3D with appropriately configured 3D viewing glasses. Alternatively, the viewer may perceive media content image 610 in 2D.

As shown in FIG. 6, first image 602-1, compensating image 604, and second image 602-2 may each have adjunct content 612 included therein. In FIG. 6, adjunct content 612 includes the word "test" for illustrative purposes only. It will be recognized that adjunct content 612 may include any other type of adjunct content described herein as may serve a particular implementation.

In some examples, as shown in FIG. 6, adjunct content 612 may be located within a neutral field 614 included in each of first image 602-1, compensating image 604, and second image 602-2. Neutral field 614 may be located within one of the margins or "pillars" that are often displayed when the aspect ratio of a media content instance is different than that of the display screen. However, it will be recognized that neutral field 614 may be located at any position within first image 602-1, compensating image 604, and second image 602-2 as may serve a particular implementation.

A pixel value (e.g., a brightness level) of neutral field 614 may be set to be substantially equal to the predetermined neutral pixel value. In this manner, the cancelation of the pixel values of the pixels associated with adjunct content 612 included in first image 602-1, compensating image 604, and second image 602-2 may cause neutral field 614 in composite image 608 to appear apparently void of adjunct content 612 to some viewers.

Adjunct content 612 may be included in first and second images 602-1 and 602-2 by setting a pixel value (e.g., a brightness level) of corresponding groups of pixels (i.e., pixels corresponding to the same locations within each image 602) included in first and second images 602-1 and 602-2, respectively, to be above a predetermined neutral pixel value (e.g., a predetermined neutral brightness level). Likewise, adjunct content 612 may be included in compensating image 604 by setting a pixel value of a group of another corresponding group of pixels included in compensating image 604 to be less than the predetermined neutral pixel value. The predetermined neutral pixel value may include any neutral pixel value (e.g., a neutral gray color) as may serve a particular implementation.

For example, FIG. 6 shows that the pixels representative of adjunct content 612 included in first and second images 602-1 and 602-2 have brightness levels that have been set to be above (i.e., brighter than) a predetermined neutral brightness level while adjunct content 612 included in compensating image 604 has a brightness level that has been set to be below (i.e., darker than) the predetermined neutral brightness level. The brightness levels of the adjunct content included in first image 602-1, compensating image 604, and second image 602-2 may be set to result in a viewer wearing 3D viewing glasses during the presentation of the images being able to perceive adjunct content 612 in composite image 608. At the same time, another viewer not wearing 3D viewing glasses during the presentation of the images may be prevented from perceiving adjunct content 612 in composite image 608.

To illustrate, the brightness levels of the pixels representative of adjunct content 612 included in first image 602-1 and in second image 602-2 may each be set to be substantially equal to one brightness unit greater than the predetermined neutral brightness level (i.e., one "positive" brightness unit). The brightness level of the pixels representative of adjunct content 612 included in compensating image 604 may be set to be substantially equal to two brightness units less than the predetermined neutral brightness level (i.e., two "negative" brightness units). As used herein, a "brightness unit" refers to any unit or measure of brightness or luminance as may serve a particular implementation.

Having the brightness levels set in this manner may facilitate perception by a viewer wearing 3D viewing glasses of adjunct content 612 having a brightness level substantially equal to one brightness unit less than the predetermined brightness level. For example, first image 602-1, compensating image 604, and second image 602-2 may be concurrently presented in accordance with a passive polarized processing technique in which first image 602-1 is polarized in a manner that allows only the left eye of a viewer wearing polarized 3D viewing glasses to see first image 602-1, and second image 602-2 is polarized in a manner that allows only the right eye of the viewer wearing polarized 3D viewing glasses to see second image 602-2. However, compensating image 604 may be non-polarized in order to allow both eyes of the viewer wearing polarized 3D viewing glasses to view compensating image 604.

In such a configuration, each eye is presented with adjunct content having a brightness level substantially equal to one brightness unit greater than the predetermined brightness level (by way of first image 602-1 or second image 602-2) and adjunct content having a brightness level substantially equal to two brightness units less than the predetermined brightness level (by way of compensating image 604). The net effect, as perceived by the viewer, is that one of the negative brightness units of the adjunct content included in compensating image 604 cancels out the positive brightness unit of the adjunct content included in each of images 602. In this manner, each eye of the viewer perceives adjunct content 612 having a brightness level substantially equal to one brightness unit less than the predetermined brightness level in composite image 608.

Alternatively, first image 602-1, compensating image 604, and second image 602-2 may be sequentially presented in accordance with an active shutter processing technique. System 100 may selectively permit a viewer wearing active shutter 3D glasses to perceive adjunct content 612 by appropriately configuring a duty cycle associated with an opening and closing of the shutters that are a part of the active shutter 3D viewing glasses.

Figure 7:
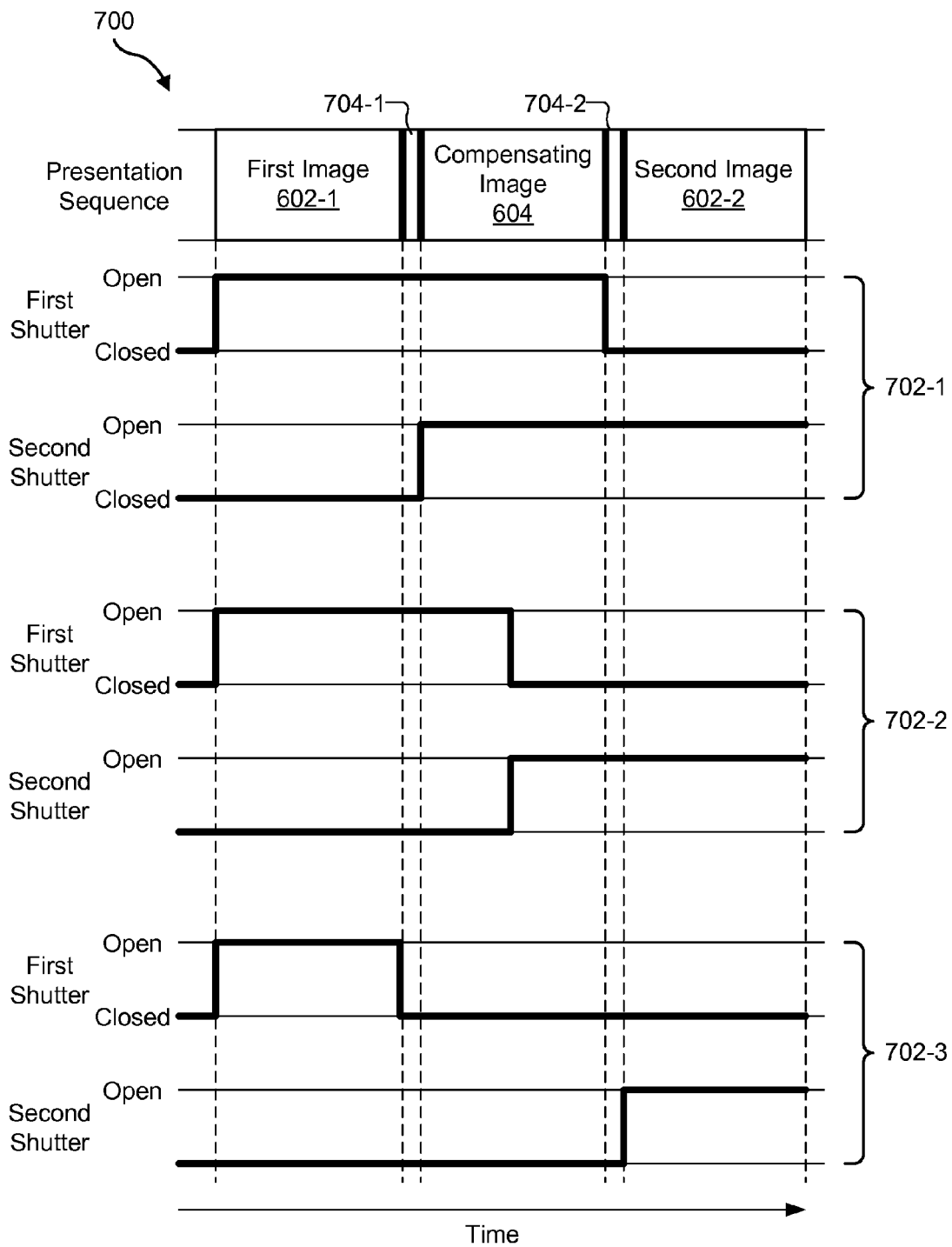
FIG. 7 shows an exemplary timing diagram of various duty cycle configurations by which active shutter 3D viewing glasses may be configured to operate according to principles described herein.

FIG. 7 shows an exemplary timing diagram 700 that illustrates various duty cycle configurations 702 (e.g., duty cycle configurations 702-1 through 702-3) by which active shutter 3D viewing glasses may operate. Each of the duty cycle configurations 702 will now be described.

Duty cycle configuration 702-1 may result in "dark" adjunct content 612 (i.e., adjunct content having a brightness level less than the predetermined neutral brightness level) being perceived by a viewer wearing active shutter 3D viewing glasses. It will be recognized that duty cycle configuration 702-1 is merely illustrative of the many different duty cycle configurations that may result in dark adjunct content 612 being perceived by a viewer wearing active shutter 3D viewing glasses.

First image 602-1, compensating image 604, and second image 602-2 may be sequentially and temporally presented in the order shown in FIG. 7. A temporal guard band 704 (e.g., temporal guard bands 704-1 and 704-2) may separate each image that is presented. It will be recognized that temporal guard bands 704 are optional and may be of any suitable length as may serve a particular implementation, for example, due to shutter transition times.

In accordance with duty cycle configuration 702-1, system 100 may direct a first shutter (e.g., a left shutter associated with a left lens of the active shutter 3D viewing glasses) to be open during the presentation of first image 602-1 and compensating image 604, and closed during the presentation of second image 602-2. Likewise, system 100 may direct a second shutter (e.g., a right shutter associated with a right lens of the active shutter 3D viewing glasses) to be closed during the presentation of first image 602-1 and open during the presentation of compensating image 604 and second image 602-2.

In this manner, each eye is presented with adjunct content having a brightness level substantially equal to one positive brightness unit (by way of first image 602-1 or second image 602-2) and adjunct content having a brightness level substantially equal to two negative brightness units (by way of compensating image 604). As described previously, the net effect, as perceived by the viewer, is that one of the negative brightness units of the adjunct content included in compensating image 604 cancels out the positive brightness unit of the adjunct content included in each of images 602. In this manner, each eye of the viewer perceives dark adjunct content 612 having a brightness level substantially equal to one brightness unit less than the predetermined brightness level in composite image 608.

Alternatively, duty cycle configuration 702-2 may result in adjunct content 612 being substantially imperceptible to a viewer wearing active shutter 3D viewing glasses. It will be recognized that duty cycle configuration 702-2 is merely illustrative of the many different duty cycle configurations that may result in adjunct content 612 being substantially imperceptible to a viewer wearing active shutter 3D viewing glasses.

In accordance with duty cycle configuration 702-2, system 100 may direct a first shutter (e.g., a left shutter associated with a left lens of the active shutter 3D viewing glasses) to be open during the presentation of first image 602-1 and during the first half of the presentation of compensating image 604, and closed during the second half of the presentation of compensating image 604 and during the presentation of second image 602-2. Likewise, system 100 may direct a second shutter (e.g., a right shutter associated with a right lens of the active shutter 3D viewing glasses) to be closed during the presentation of first image 602-1 and during the first half of the presentation of compensating image 604, and open during the second half of the presentation of compensating image 604 and during the presentation of second image 602-2.

In this manner, the brightness level of the adjunct content included in compensating image 604 effectively cancels out the brightness level of the adjunct content included in each of first and second images 602-1 and 602-2. The net effect, as perceived by the viewer, is that the adjunct content is substantially imperceptible to the viewer.

Alternatively, duty cycle configuration 702-3 may result in "light" adjunct content 612 (i.e., adjunct content having a brightness level greater than the predetermined neutral brightness level) being perceived by a viewer wearing active shutter 3D viewing glasses. It will be recognized that duty cycle configuration 702-3 is merely illustrative of the many different duty cycle configurations that may result in light adjunct content 612 being perceived by a viewer wearing active shutter 3D viewing glasses.

In accordance with duty cycle configuration 702-3, system 100 may direct a first shutter (e.g., a left shutter associated with a left lens of the active shutter 3D viewing glasses) to be open during the presentation of first image 602-1 and closed during the presentation of compensating image 604 and second image 602-2. Likewise, system 100 may direct a second shutter (e.g., a right shutter associated with a right lens of the active shutter 3D viewing glasses) to be closed during the presentation of first image 602-1 and compensating image 604 and open during the presentation of second image 602-2.

In this manner, compensating image 604 is not viewed by either eye of the viewer. As a result, each eye of the viewer perceives light adjunct content 612 having a brightness level substantially equal to one brightness unit greater than the predetermined brightness level in composite image 608.

Figure 8:
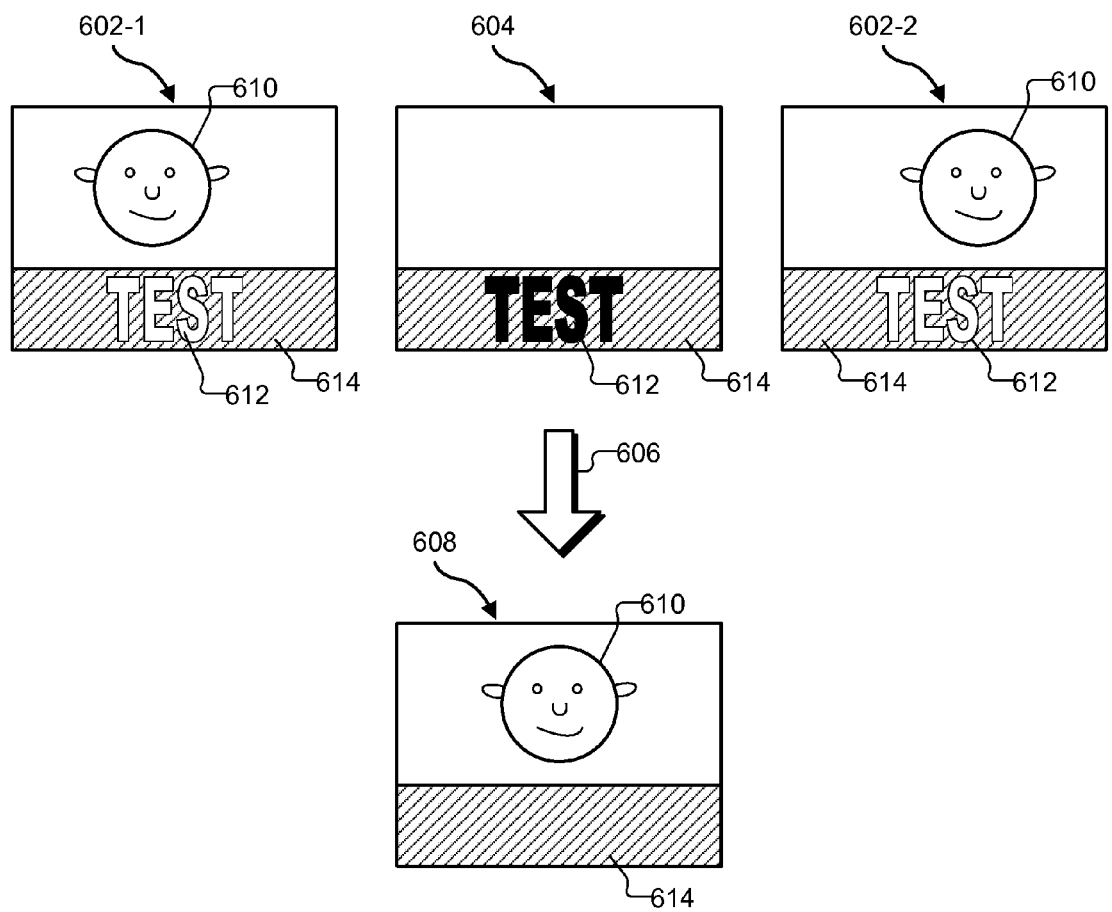
FIG. 8 shows another exemplary viewing scenario according to principles described herein.

If, as described above in connection with FIG. 6, images 602 each include adjunct content 612 having a brightness level substantially equal to one positive brightness unit and compensating image 604 includes adjunct content 612 having a brightness level substantially equal to two negative brightness units, adjunct content 612 may be substantially imperceptible to a viewer not wearing 3D viewing glasses during the presentation of first image 602-1, compensating image 604, and second image 602-2. This is because both eyes of the viewer may view both first and second images 602-1 and 602-2 and compensating image 604. The net effect, as perceived by the viewer not wearing 3D viewing glasses, is that the two negative brightness units of the adjunct content included in compensating image 604 cancel out the combined positive brightness units of the adjunct content included in first and second images 602-1 and 602-2. This is illustrated in FIG. 8, which shows composite image 608 as not having adjunct content included therein.

Returning to method 500 described in connection with FIG. 5, the pixel values of the first, second, and third groups of pixels may be alternatively set (e.g., by adjunct content management facility 104) to result in the adjunct content being substantially imperceptible to a viewer wearing 3D viewing glasses during the presentation of the first image, the compensating image, and the second image, and perceptible to another viewer not wearing 3D viewing glasses during the presentation of the images.

For example, the brightness levels of the pixels representative of adjunct content 612 included in first image 602-1 and in second image 602-2 may each be set to be substantially equal to one brightness unit greater than the predetermined neutral brightness level (i.e., one positive brightness unit). The brightness level of the pixels representative of adjunct content 612 included in compensating image 604 may be set to be substantially equal to one brightness unit less than the predetermined neutral brightness level (i.e., one negative brightness unit).

Figure 9:
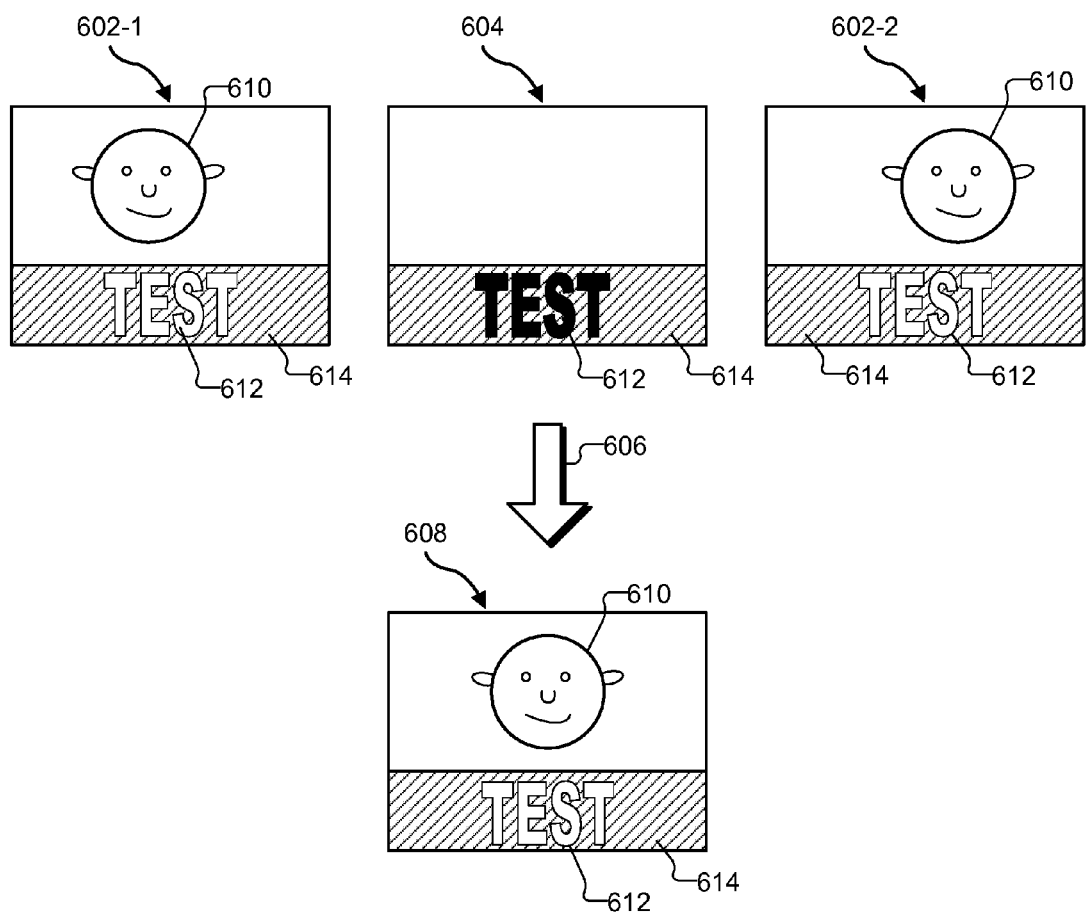
FIG. 9 shows another exemplary viewing scenario according to principles described herein.

In such a configuration, each eye of a viewer wearing 3D viewing glasses configured to operate in accordance with duty cycle configuration 702-1 is presented with adjunct content having a brightness level substantially equal to one positive brightness unit (by way of first image 602-1 or second image 602-2) and adjunct content having a brightness level substantially equal to one negative brightness unit (by way of compensating image 604). The net effect, as perceived by the viewer, is that the negative brightness unit of the adjunct content included in compensating image 604 cancels out the positive brightness unit of the adjunct content included in each of images 602, thereby rendering the adjunct content substantially imperceptible to the viewer (i.e., the viewer perceives composite image 608 as being void of adjunct content as illustrated in FIG. 8). However, a viewer not wearing 3D viewing glasses may perceive the adjunct content. This is because both eyes of the viewer may view both first and second images 602-1 and 602-2 and compensating image 604. The net effect, as perceived by the viewer not wearing 3D viewing glasses, is that the one negative brightness unit of the adjunct content included in compensating image 604 only cancels out one of the two combined positive brightness units of the adjunct content included in first and second images 602-1 and 602-2. Hence, the viewer not wearing 3D viewing glasses perceives adjunct content having a brightness level substantially equal to one positive brightness unit. This is illustrated in FIG. 9, which shows composite image 608 as including adjunct content 612 having a brightness level greater than the predetermined neutral brightness level.

By presenting adjunct content to only those viewers not wearing 3D viewing glasses, system 100 may present one or more messages intended specifically for those viewers not wearing 3D viewing glasses. For example, the adjunct content may include a message such as: "This program is being shown in 3D. Would you like to continue or switch to non-3D mode?" A viewer not wearing 3D viewing glasses may perceive the adjunct content and select an option presented by way of a graphical user interface, for example, that directs system 100 to present the program in a non-3D mode.

It will be recognized that the preceding examples of setting a brightness level of various groups of pixels associated with adjunct content are merely illustrative of the many different manners in which pixel values may be set to facilitate selective perception of adjunct content by one or more viewers. Any other pixel value of adjunct content 612 may be set to be any number of pixel value units above or below a predetermined neutral pixel value. As used herein, a "pixel value unit" refers to any unit or measure of a visual attribute of a pixel as may serve a particular implementation, including, for example, one or more RGB values.

In some examples, the pixel values of the pixels associated with adjunct content 612 included in images 602 and in compensating image 604 may be adjusted or set by system 100 to compensate for non-linear response, habituation, and variable response times of the human vision system. For example, system 100 may periodically switch between including "light" and "dark" adjunct content in images 602 and in compensating image 604. To illustrate, after a predetermined time period, system 100 may switch from assigning "light" adjunct content to images 602 and "dark" adjunct content to compensating image 604 images to assigning "dark" adjunct content to images 602 and "light" adjunct content to compensating image 604. Additionally or alternatively, the pixel values associated with adjunct content 612 included in images 602 and in compensating image 604 may be adjusted to account for the relative presentation duration of images 602 and compensating image 604.

In some examples, system 100 may automatically facilitate perception of adjunct content by a viewer wearing 3D viewing glasses in response to the adjunct content meeting at least one predetermined criterion. For example, the pixel values associated with adjunct content included in images 602 and compensating image 604 may be initially set in a manner that prevents a viewer wearing 3D viewing glasses from perceiving the adjunct content. In response to the adjunct content meeting at least one criterion, system 100 may automatically adjust the pixel values in a manner that allows the viewer to perceive the adjunct content. In some examples, the at least one predetermined criterion may be specified by the viewer (e.g., by way of a graphical user interface provided by system 100 and/or by selecting one or more options provided by the 3D viewing glasses). For example, the viewer may specify that an incoming phone call from a certain telephone number (e.g., a telephone number associated with a family member of the viewer) results in adjunct content containing caller identification information associated with the incoming phone call being perceived by the viewer. Alternatively, the at least one predetermined criterion may be specified by system 100. For example, system 100 may be configured to automatically facilitate perception of adjunct content if the adjunct content includes an emergency notification.

In scenarios in which images 602 and compensating image 604 are presented in accordance with an active shutter processing technique, system 100 may direct active shutter 3D viewing glasses to operate in accordance with any of the duty cycle configurations described herein in any suitable manner as may serve a particular implementation. For example, system 100 may control an operation of the shutters that are a part of the active shutter 3D viewing glasses by way of IR transmitter 402, by way of one or more software-implemented commands, and/or in any other suitable manner. The active shutter 3D viewing may include any suitable combination of components configured to facilitate selective control of a duty cycle associated with the operation of its lenses.

Figure 10:
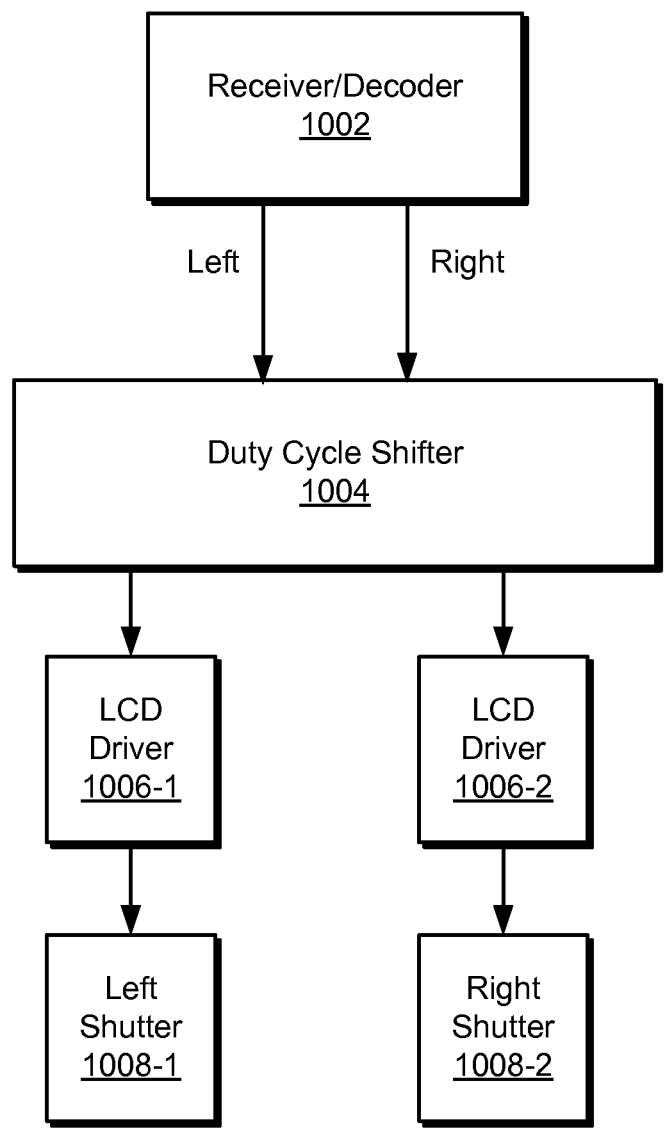
FIG. 10 illustrates exemplary components that may be used to facilitate control of active shutter 3D viewing glasses according to principles described herein.

For example, FIG. 10 illustrates exemplary components that may be included within active shutter 3D viewing glasses that may be used to facilitate control of the active shutter 3D viewing glasses by system 100. As shown in FIG. 10, active shutter 3D viewing glasses may include a receiver/decoder 1002, a duty cycle shifter 1004, liquid crystal display ("LCD") drivers 1006 (e.g., LCD drivers 1006-1 and 1006-2), and left and right shutters 1008-1 and 1008-2 (collectively "shutters 1008"). It will be recognized that receiver/decoder 1002 and/or duty cycle shifter 1004 may be alternatively included in or implemented by system 100, 3D content presentation subsystem 204, 3D content processing device 302, and/or IR transmitter 402.

Receiver/decoder 1002 may be configured to receive and/or decode commands transmitted thereto by system 100 (e.g., by way of IR transmitter 402). The commands may be input into duty cycle shifter 1004, which may be configured to adjust a duty cycle of shutters 1008 in accordance with the received commands. For example, duty cycle shifter 1004 may output signals configured to control a LCD driver 1006-1 associated with left shutter 1008-1 and a LCD driver 1006-2 associated with right shutter 1008-2. LCD drivers 1006 may be configured to operate in any suitable manner.

Figure 11:
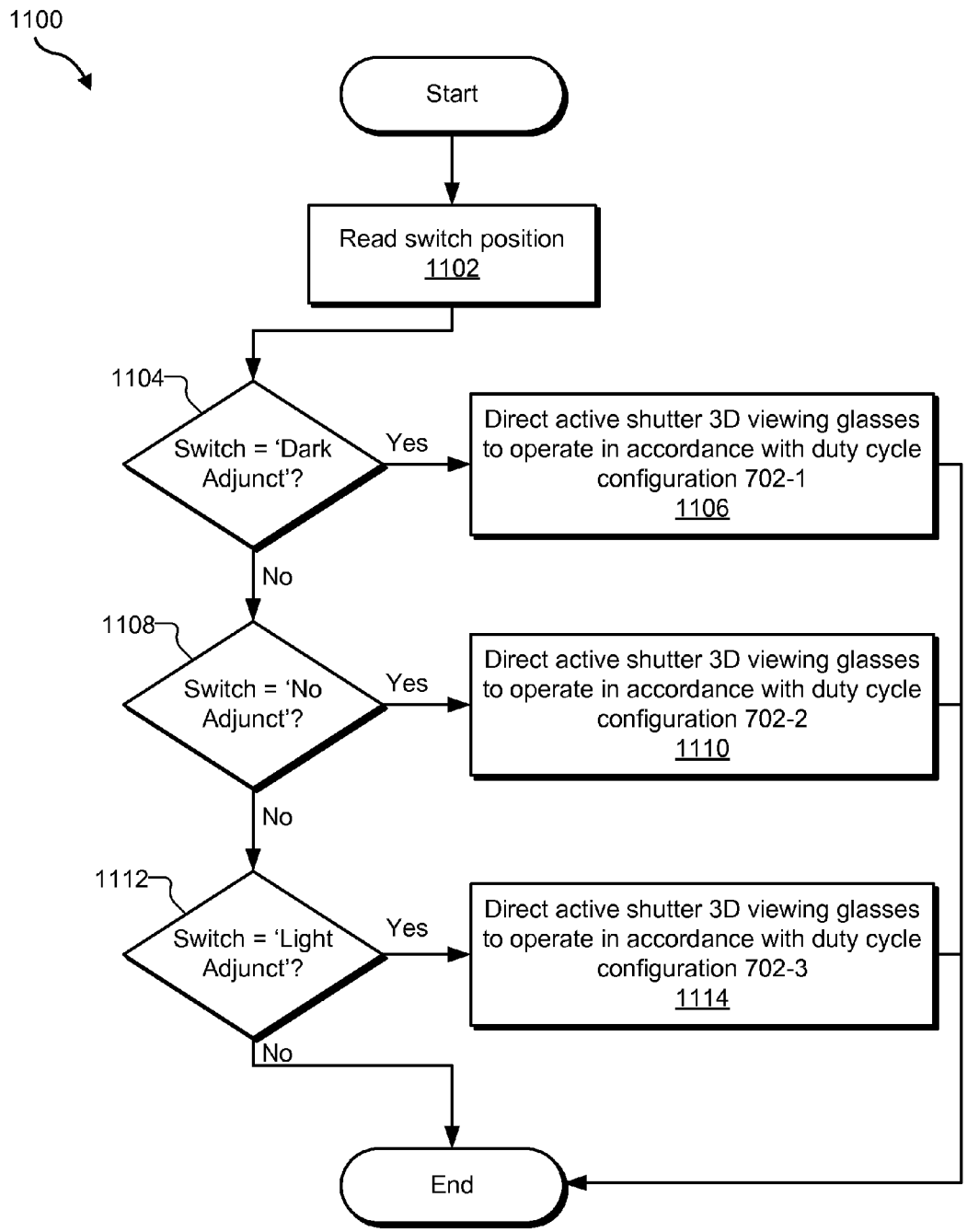
FIG. 11 shows an exemplary flowchart illustrating an exemplary method that may be used to selectively direct active shutter 3D viewing glasses to operate in accordance with one of a plurality of duty cycle configurations according to principles described herein.

FIG. 11 shows an exemplary flowchart illustrating an exemplary method that may be used to selectively direct active shutter 3D viewing glasses to operate in accordance with one of duty cycle configurations 702. To facilitate the method of FIG. 11, the active shutter 3D viewing glasses may include a switch that may be selectively positioned by a user thereof, by system 100, and/or in any other manner. IR transmitter 402 may send various timing signals to the active shutter 3D viewing glasses to facilitate synchronization of shutters 1008 in conjunction with the duty cycle configurations 702 of FIG. 7. For example, IR transmitter 402 may send timing signals to the active shutter 3D viewing glasses indicating start and end times of a presentation of first image 602-1, compensating image 604, and/or second image 602-2. In some examples, one or more of these start and end times may be derived or inferred using, for example, independent timing logic included within the active shutter 3D viewing glasses.

As illustrated in FIG. 11, in step 1102, a position of the switch associated with the active shutter 3D viewing glasses may be read. Step 1102 may be performed in any suitable manner.

If the switch position indicates that dark adjunct content is to be presented to the viewer (Yes; step 1104), the active shutter 3D viewing glasses are directed to operate in accordance with duty cycle configuration 702-1 (step 1106). Alternatively, if the switch position indicates that no adjunct content is to be perceived by the viewer (Yes; step 1108), the active shutter 3D viewing glasses are directed to operate in accordance with duty cycle configuration 702-2 (step 1110). Alternatively, if the switch position indicates that light adjunct content is to be presented to the viewer (Yes; step 1112), the active shutter 3D viewing glasses are directed to operate in accordance with duty cycle configuration 702-3 (step 1114). Steps 1106, 1110, and 1114 may be performed in any suitable manner as may serve a particular implementation.

An exemplary implementation of the methods and systems described herein will now be described in connection with FIGS. 12-13. It will be recognized that the exemplary implementation described in connection with FIGS. 12-13 is merely illustrative of the many different scenarios in which the methods and systems described herein may be employed.

Figure 12:
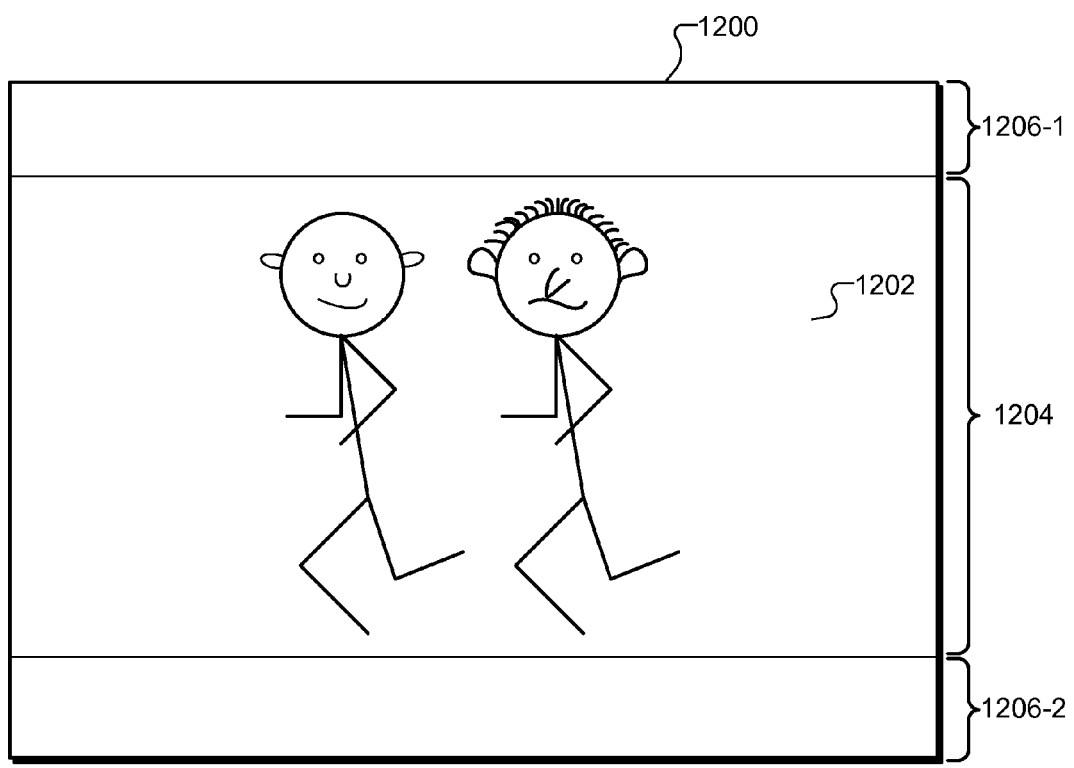
FIG. 12 illustrates an exemplary display screen having a particular scene of a media content instance displayed therein according to principles described herein.
Figure 13:
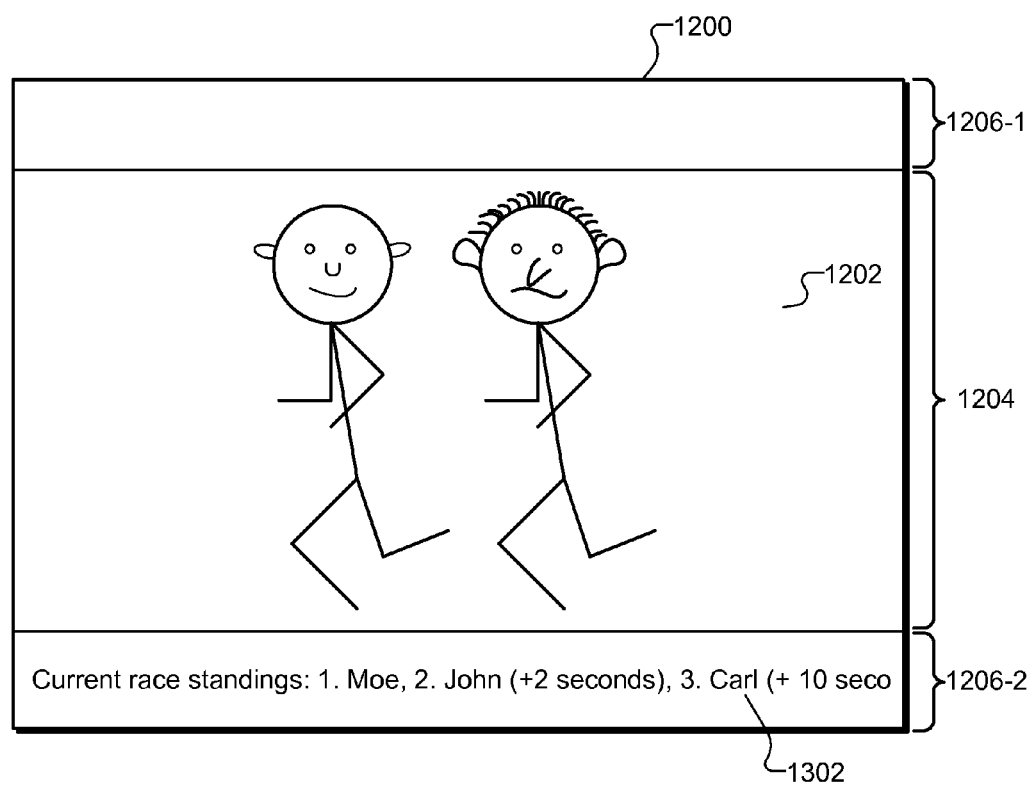
FIG. 13 shows the display screen of FIG. 13 with adjunct content displayed therein according to principles described herein.

FIG. 12 illustrates an exemplary display screen 1200 having a particular scene of a media content instance 1202 (e.g., a live broadcast of a sporting event) displayed therein. As shown in FIG. 12, media content instance 1202 may be displayed within a main content portion 1204 of display screen 1200. Media content instance 1202 may be displayed in 2D or 3D as may serve a particular implementation.

One or more blank portions 1206 (e.g., blank portions 1206-1 and 1206-2) may also be displayed within display screen 1200. Blank portions 1206 may be displayed above and/or below main content portion 1206, as shown in FIG. 12, or at any other location within display screen 1200 as may serve a particular implementation. In some examples, blank portions 1206 may be displayed when the aspect ratio of media content instance 1202 is different than that of display screen 1200. Alternatively, one or more blank portions 1206 may be displayed as specified by system 100.

In some examples, display screen 1200 may be a part of a television device located within a particular household. Two or more members of the household may decide to watch media content instance 1202 within display screen 1200 together. One of the household members (e.g., the wife) may desire to watch media content instance 1202 without concurrently seeing any type of adjunct content within display screen 1200. However, another member of the household (e.g., the husband) may be extremely interested in the media content instance 1202 and therefore desire to see real time statistics or other types of adjunct content related to media content instance 1200. In this scenario, the viewing desires of both household members may be concurrently satisfied by the methods and systems described herein.

To illustrate, media content instance 1202 may be presented in the form of multiple pairs of first and second images (e.g., left and right images) as described herein. Each image may have adjunct content included therein (e.g., within one or more of blank portions 1206). To see the media content instance 1202 without perceiving the adjunct content, the wife may either watch the media content instance 1202 without 3D viewing glasses or with 3D viewing glasses that allow her to view both images included in each pair of presented images. The husband, on the other hand, may perceive the adjunct content by wearing viewing glasses that allow him to view only one image included in each pair of presented images in any of the ways described herein. Exemplary adjunct content that may be perceived by the husband is shown in FIG. 13. As shown in FIG. 13, adjunct content 1302 may be displayed within blank portion 1206-2. Adjunct content 1302 may be additionally or alternatively displayed at any other location within display screen 1200 as may serve a particular implementation.

Figure 14:
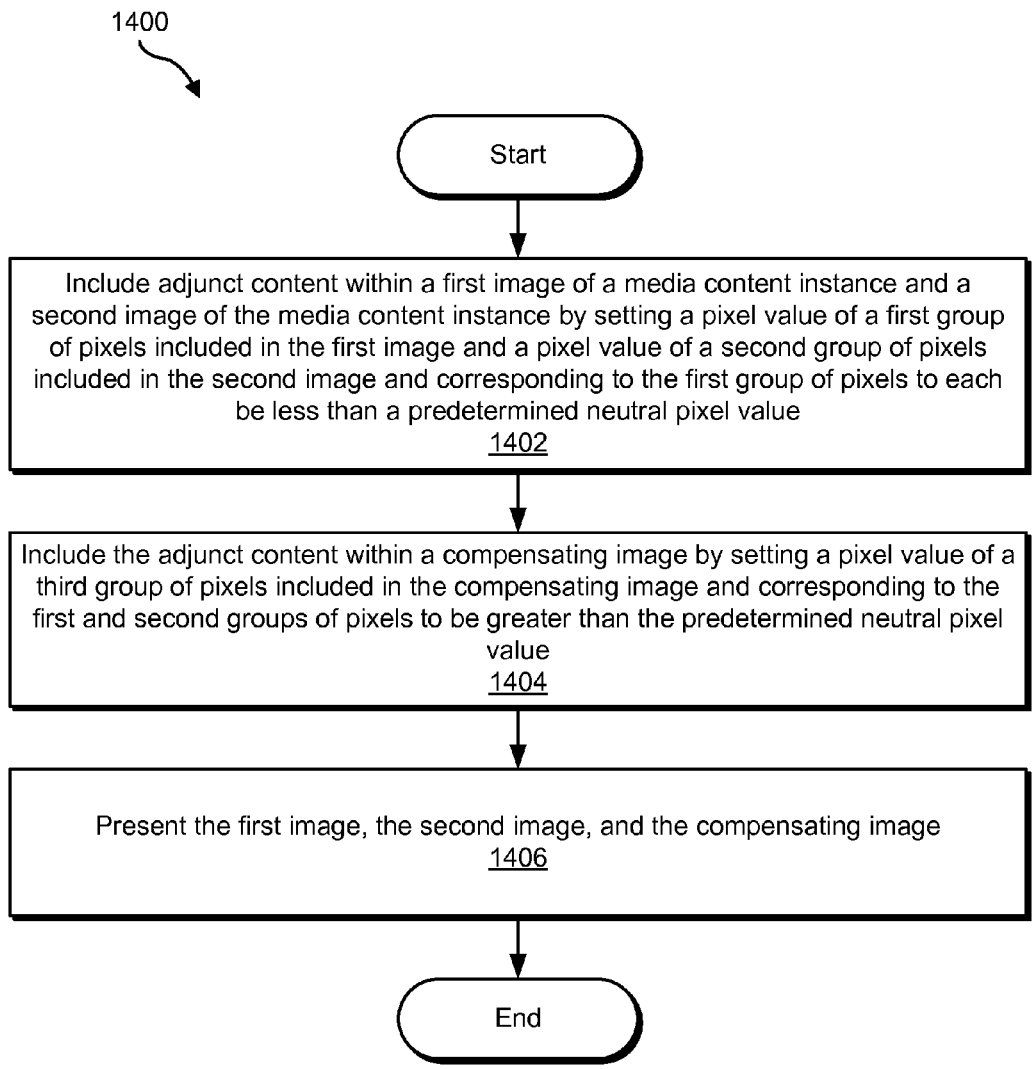
FIG. 14 illustrates another exemplary method of presenting adjunct content during a presentation of a media content instance according to principles described herein.

It will be recognized that the first and second images described herein may alternatively include adjunct content having a pixel value less than a predetermined neutral pixel value and that the compensating image described herein may alternatively include adjunct content having a pixel value greater than a predetermined neutral pixel value. For example, FIG. 14 illustrates another exemplary method 1400 of presenting adjunct content during a presentation of a media content instance. While FIG. 14 illustrates exemplary steps according to one embodiment, other embodiments may omit, add to, reorder, and/or modify any of the steps shown in FIG. 14. The steps shown in FIG. 14 may be performed by any component or combination of components of system 100, media content provider subsystem 202, 3D content presentation subsystem 204, and/or 3D content processing device 302.

In step 1402, adjunct content is included within a first image of a media content instance and a second image of the media content instance by setting a pixel value of a first group of pixels included in the first image and a pixel value of a second group of pixels included in the second image and corresponding to the first group of pixels to each be less than a predetermined neutral pixel value. Step 1402 may be performed in any of the ways described herein.

In step 1404, the adjunct content is included within a compensating image by setting a pixel value of a third group of pixels included in the compensating image and corresponding to the first and second groups of pixels to be greater than the predetermined neutral pixel value. Step 1404 may be performed in any of the ways described herein.

In step 1406, the first image, the second image, and the compensating image are presented. Step 1406 may be performed in any of the ways described herein.

In method 1400, the pixel values of the first, second, and third groups of pixels may be set to result in the adjunct content being perceptible to a viewer wearing 3D viewing glasses during the presentation of the first image, the second image, and the compensating image, and substantially imperceptible to another viewer not wearing 3D viewing glasses during the presentation of the first image, the second image, and the compensating image.

To illustrate, the pixel values of the first and second groups of pixels in the first and second images, respectively, may each be set to be substantially equal to one pixel value unit less than the predetermined neutral pixel value (i.e., one negative pixel value unit). The pixel value of the third group of pixels in the compensating image may be set to be substantially equal to two pixel value units greater than the predetermined neutral pixel value (i.e., two positive pixel value units). The net effect, as perceived by the viewer wearing 3D viewing glasses, is that one of the positive pixel value units of the adjunct content included in the compensating image cancels out the negative pixel value unit of the adjunct content included in each of images 602. In this manner, each eye of the viewer wearing 3D viewing glasses perceives adjunct content having a pixel value substantially equal to one positive pixel value unit. However, as perceived by a viewer not wearing 3D viewing glasses, the net effect is that the two positive pixel value units of the adjunct content included in the compensating image cancel out the combined negative pixel value units of the adjunct content included in the first and second images, thereby preventing the viewer not wearing 3D viewing glasses from perceiving the adjunct content.

Alternatively, in method 1400, the pixel values of the first, second, and third groups of pixels may be set to result in the adjunct content being substantially imperceptible to a viewer wearing 3D viewing glasses during the presentation of the first image, the second image, and the compensating image, and perceptible to another viewer not wearing 3D viewing glasses during the presentation of the first image, the second image, and the compensating image.

To illustrate, the pixel values of the first and second groups of pixels in the first and second images, respectively, may each be set to be substantially equal to one pixel value unit less than the predetermined neutral pixel value (i.e., one negative pixel value unit). The pixel value of the third group of pixels in the compensating image may be set to be substantially equal to one pixel value unit greater than the predetermined neutral pixel value (i.e., one positive pixel value unit). The net effect, as perceived by the viewer wearing 3D viewing glasses, is that the positive pixel value unit of the adjunct content included in the compensating image cancels out the negative brightness unit of the adjunct content included in each of the first and second images, thereby rendering the adjunct content substantially imperceptible to the viewer wearing 3D viewing glasses. However, as perceived by a viewer not wearing 3D viewing glasses, the net effect is that the one positive pixel value unit of the adjunct content included in the compensating image only cancels out one of the two combined negative pixel value units of the adjunct content included in first and second images. Hence, the viewer not wearing 3D viewing glasses perceives adjunct content having a pixel value substantially equal to one negative pixel value unit.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 15:
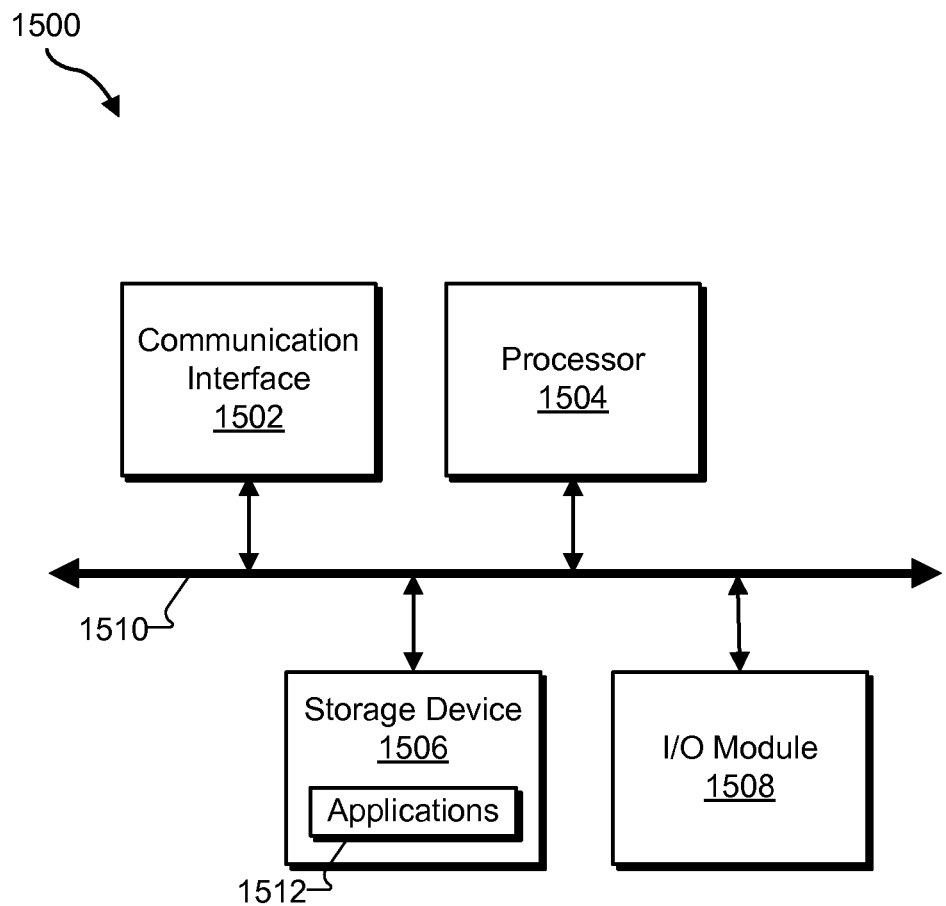
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1506. For example, data representative of one or more executable applications 1512 (which may include, but are not limited to, one or more of the software applications described herein) configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with media content management facility 102, adjunct content management facility 104, and/or presentation facility 106. Likewise, storage facility 108 may be implemented by or within storage device 1506.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

including, by an adjunct content presentation system, adjunct content within a first image of a media content instance and a second image of the media content instance by setting a pixel value of a first group of pixels included in the first image and a pixel value of a second group of pixels included in the second image and corresponding to the first group of pixels to each be greater than a predetermined neutral pixel value;

including, by the adjunct content presentation system, the adjunct content within a compensating image by setting a pixel value of a third group of pixels included in the compensating image and corresponding to the first and second groups of pixels to be less than the predetermined neutral pixel value; and presenting, by the adjunct content presentation system, the first image, the second image, and the compensating image;

wherein the pixel values of the first, second, and third groups of pixels are set to result in the adjunct content being perceptible to a viewer wearing three-dimensional ("3D") viewing glasses during the presentation of the first image, the second image, and the compensating image and substantially imperceptible to another viewer not wearing 3D viewing glasses during the presentation of the first image, the second image, and the compensating image;

the pixel value of the first group of pixels included in the first image and the pixel value of the second group of pixels included in the second image are both substantially equal to one pixel value unit greater than the predetermined neutral pixel value; and the pixel value of the third group of pixels included in the compensating image is substantially equal to two pixel value units less than the predetermined neutral pixel value.

2. The method of claim 1, wherein the presenting comprises concurrently presenting the first image, the second image, and the compensating image in accordance with a passive polarized processing technique.

3. The method of claim 2, wherein the 3D viewing glasses worn by the viewer comprise:
   a first lens comprising a first type of polarizing filter configured to allow a first eye of the viewer to view only the first image and the compensating image; and
   a second lens comprising a second type of polarizing filter configured to allow a second eye of the viewer to view only the second image and the compensating image.

4. The method of claim 1, wherein the presenting comprises sequentially presenting the first image, the second image, and the compensating image in accordance with an active shutter processing technique.

5. The method of claim 4, further comprising permitting, by the adjunct content presentation system, the viewer to perceive the adjunct content by:
   directing a first shutter associated with a first lens of the 3D viewing glasses worn by the viewer to be open during the presentation of the first image and the compensating image and closed during the presentation of the second image; and
   directing a second shutter associated with a second lens of the 3D viewing glasses worn by the viewer to be closed during the presentation of the first image and open during the presentation of the compensating image and the second image.

6. The method of claim 1, wherein the adjunct content comprises at least one of subtitle content, text messaging content, and ticker tape content.

7. The method of claim 1, embodied as computer-executable instructions on at least one non-transitory computer-readable medium.

8. A method comprising:
   including, by an adjunct content presentation system, adjunct content within a first image of a media content instance and a second image of the media content instance by setting a pixel value of a first group of pixels included in the first image and a pixel value of a second group of pixels included in the second image and corresponding to the first group of pixels to each be less than a predetermined neutral pixel value;
   including, by the adjunct content presentation system, the adjunct content within a compensating image by setting a third group of pixels included in the compensating image and corresponding to the first and second groups of pixels to have a pixel value greater than the predetermined neutral pixel value; and
   presenting, by the adjunct content presentation system, the first image, the second image, and the compensating image;
   wherein
      the pixel values of the first, second, and third groups of pixels are set to result in the adjunct content being perceptible to a viewer wearing three-dimensional ("3D") viewing glasses during the presentation of the first image, the second image, and the compensating image and substantially imperceptible to another viewer not wearing 3D viewing glasses during the presentation of the first image, the second image, and the compensating image;
      the pixel value of the first group of pixels included in the first image and the pixel value of the second group of pixels included in the second image are both substantially equal to one pixel value unit less than the predetermined neutral pixel value; and
      the pixel value of the third group of pixels included in the compensating image is substantially equal to two pixel value units greater than the predetermined neutral pixel value.

9. The method of claim 8, wherein the presenting comprises concurrently presenting the first image, the second image, and the compensating image in accordance with a passive polarized processing technique.

10. The method of claim 9, wherein the 3D viewing glasses worn by the viewer comprise:
   a first lens comprising a first type of polarizing filter configured to allow a first eye of the viewer to view only the first image and the compensating image; and
   a second lens comprising a second type of polarizing filter configured to allow a second eye of the viewer to view only the second image and the compensating image.

11. The method of claim 8, wherein the presenting comprises sequentially presenting the first image, the second image, and the compensating image in accordance with an active shutter processing technique.

12. The method of claim 11, further comprising permitting, by the adjunct content presentation system, the viewer to perceive the adjunct content by:
   directing a first shutter associated with a first lens of the 3D viewing glasses worn by the viewer to be open during the presentation of the first image and the compensating image and closed during the presentation of the second image; and
   directing a second shutter associated with a second lens of the 3D viewing glasses worn by the viewer to be closed during the presentation of the first image and open during the presentation of the compensating image and the second image.

13. The method of claim 8, embodied as computer-executable instructions on at least one non-transitory computer-readable medium.

14. A method comprising:
   including, by an adjunct content presentation system, adjunct content within a first image of a media content instance and a second image of the media content instance by setting a pixel value of a first group of pixels included in the first image and a pixel value of a second group of pixels included in the second image and corresponding to the first group of pixels to each be greater than a predetermined neutral pixel value;
   including, by the adjunct content presentation system, the adjunct content within a compensating image by setting a pixel value of a third group of pixels included in the compensating image and corresponding to the first and second groups of pixels to be less than the predetermined neutral pixel value; and
   presenting, by the adjunct content presentation system, the first image, the second image, and the compensating image;
   wherein the pixel values of the first, second, and third groups of pixels are set to result in the adjunct content being substantially imperceptible to a viewer wearing three-dimensional ("3D") viewing glasses during the presentation of the first image, the second image, and the compensating image and perceptible to another viewer not wearing 3D viewing glasses during the presentation of the first image, the second image, and the compensating image;

wherein the pixel value of the first group of pixels included in the first image and the pixel value of the second group of pixels included in the second image are both substantially equal to one pixel value unit greater than the predetermined neutral pixel value; and the pixel value of the third group of pixels included in the compensating image is substantially equal to one pixel value unit less than the predetermined neutral pixel value.

15. The method of claim 14, wherein the 3D viewing glasses worn by the viewer comprise:
 a first lens comprising a first type of polarizing filter configured to allow a first eye of the viewer to view only the first image and the compensating image; and
 a second lens comprising a second type of polarizing filter configured to allow a second eye of the viewer to view only the second image and the compensating image.

16. The method of claim 14, embodied as computer-executable instructions on at least one non-transitory computer-readable medium.

17. A method comprising:
 including, by an adjunct content presentation system, adjunct content within a first image of a media content instance and a second image of the media content instance by setting a pixel value of a first group of pixels included in the first image and a pixel value of a second group of pixels included in the second image and corresponding to the first group of pixels to each be less than a predetermined neutral pixel value;
 including, by the adjunct content presentation system, the adjunct content within a compensating image by setting a pixel value of a third group of pixels included in the compensating image and corresponding to the first and second groups of pixels to be greater than the predetermined neutral pixel value; and
 presenting, by the adjunct content presentation system, the first image, the second image, and the compensating image;
 wherein the pixel values of the first, second, and third groups of pixels are set to result in the adjunct content being substantially imperceptible to a viewer wearing three-dimensional ("3D") viewing glasses during the presentation of the first image, the second image, and the compensating image and perceptible to another viewer not wearing 3D viewing glasses during the presentation of the first image, the second image, and the compensating image;

wherein the pixel value of the first group of pixels included in the first image and the pixel value of the second group of pixels included in the second image are both substantially equal to one pixel value unit less than the predetermined neutral pixel value; and
 the pixel value of the third group of pixels included in the compensating image is substantially equal to one pixel value unit greater than the predetermined neutral pixel value.

18. The method of claim 17, embodied as computer-executable instructions on at least one non-transitory computer-readable medium.

19. A system comprising:
 an adjunct content management facility configured to
  include adjunct content within a first image of a media content instance and a second image of the media content instance by setting a pixel value of a first group of pixels included in the first image and a pixel value of a second group of pixels included in the second image and corresponding to the first group of pixels to each be greater than a predetermined neutral pixel value, and
  include the adjunct content within a compensating image by setting a pixel value of a third group of pixels included in the compensating image and corresponding to the first and second groups of pixels to be less than the predetermined neutral pixel value; and
 a presentation facility communicatively coupled to the adjunct content management facility and configured to present the first image, the second image, and the compensating image;
 wherein
  the pixel values of the first, second, and third groups of pixels are set to result in the adjunct content being perceptible to a viewer wearing three-dimensional ("3D") viewing glasses during the presentation of the first image, the second image, and the compensating image and substantially imperceptible to another viewer not wearing 3D viewing glasses during the presentation of the first image, the second image, and the compensating image;
  the pixel value of the first group of pixels included in the first image and the pixel value of the second group of pixels included in the second image are both substantially equal to one pixel value unit greater than the predetermined neutral pixel value; and
  the pixel value of the third group of pixels included in the compensating image is substantially equal to two pixel value units less than the predetermined neutral pixel value.

* * * * *